United States Patent
Sorenson, Jr.

(10) Patent No.: US 7,179,381 B2
(45) Date of Patent: Feb. 20, 2007

(54) EMPLACEMENT OF TREATMENT AGENTS USING SOIL FRACTURING FOR REMEDIATION OF SUBSURFACE ENVIRONMENTAL CONTAMINATION

(75) Inventor: Kent S. Sorenson, Jr., Idaho Falls, ID (US)

(73) Assignee: SRP Technologies, Inc., Idaho Falls, ID (US)

( * ) Notice: Subject to any disclaimer, the term of this patent is extended or adjusted under 35 U.S.C. 154(b) by 188 days.

(21) Appl. No.: 10/817,163

(22) Filed: Apr. 1, 2004

(65) Prior Publication Data
US 2005/0006094 A1 Jan. 13, 2005

Related U.S. Application Data

(60) Provisional application No. 60/459,811, filed on Apr. 1, 2003.

(51) Int. Cl.
*C02F 3/00* (2006.01)

(52) U.S. Cl. .................. 210/610; 210/747; 405/128

(58) Field of Classification Search ............... 210/610, 210/747; 405/128
See application file for complete search history.

(56) References Cited

U.S. PATENT DOCUMENTS

| | | | | |
|---|---|---|---|---|
| 5,560,737 A | * | 10/1996 | Schuring et al. | 405/128.45 |
| 6,589,776 B1 | * | 7/2003 | Harkness | 435/262.5 |
| 6,806,078 B2 | * | 10/2004 | Newman | 435/262.5 |
| 2002/0020665 A1 | * | 2/2002 | Sorenson | 210/601 |
| 2004/0126190 A1 | * | 7/2004 | Stegemeier et al. | 405/128.6 |

* cited by examiner

*Primary Examiner*—Chester T. Barry
(74) *Attorney, Agent, or Firm*—Clayton, Howarth & Cannon, P.C.

(57) ABSTRACT

A method for treating contamination in subsurface formations includes fracturing the soil to produce a network of fractures in the formation and simultaneously injecting a slurry containing an optional proppant and a solid-phase or nonaqueous-phase treatment agent into the network of fractures. The proppant is for keeping the fractures open, and the treatment agent accelerates conversion of the contaminants into immobile or less toxic forms. Chitin is an illustrative solid-phase treatment agent, which functions as an electron donor for anaerobic reductive dechlorination mediated by dechlorinating bacteria.

33 Claims, 11 Drawing Sheets

EMPLACEMENT OF TREATMENT AGENTS USING SOIL FRACTURING FOR REMEDIATION OF SUBSURFACE ENVIRONMENTAL CONTAMINATION

CROSS-REFERENCE TO RELATED APPLICATIONS

This application claims the benefit of U.S. Provisional Application No. 60/459,811, filed Apr. 1, 2003, which is hereby incorporated by reference in its entirety.

STATEMENT REGARDING FEDERALLY SPONSORED RESEARCH OR DEVELOPMENT

This invention was supported by grant no. 0109868 from the National Science Foundation Phase I Small Business Innovation Research Biotechnology Proposal program and by an award from the U.S. Environmental Protection Agency Technical Support Project (National Exposure Research Laboratory, Las Vegas, Nev.) and Region 4 (Atlanta, Ga.). The government has certain rights in the invention.

BACKGROUND OF THE INVENTION

This invention relates to a process for remediation of environmental contamination in subsurface soils. More particularly, this invention relates to remediation processes involving emplacement of solid-phase or other nonaqueous-phase treatment agents with soil fracturing technology. Emplacement of chitin as an electron donor for microorganisms that carry out reductive dechlorination of chlorinated solvent source areas or plumes in low permeability media is illustrative of the invention.

Chlorinated solvents are the most common class of ground water contaminants at hazardous waste sites in the U.S. In a list of the top 25 most frequently detected contaminants at such sites, the Agency for Toxic Substances and Disease Registry (ATSDR) found that 10 of the top 20, including two of the top three, were chlorinated solvents or their degradation products. National Research Council, Alternatives for Ground Water Cleanup (National Academy Press, Washington, D.C. 1994). In fact, the same survey found that the most common contaminant, trichloroethylene (TCE), is present in more than 40% of National Priority List sites. Worse yet, remediation of ground water contaminated by these compounds often presents unique obstacles related to their inherent characteristics, including hydrophobicity and high density.

Overcoming these obstacles often demands innovation and an interdisciplinary approach that integrates hydrology, geology, chemistry, microbiology, and economics. In particular, an innovative approach has been conceived, and is described herein, to harness recent advances in the understanding of biodegradation processes involving chlorinated solvents for remediating residual source areas, or for cutting off dissolved plumes, by emplacing solid-phase or other nonaqueous-phase treatment agents into a variety of soil types throughout much larger volumes of the subsurface than has been possible using conventional methods. One embodiment of this innovation involves delivering chitin, as an electron donor, into induced fractures in low permeability soils to create and maintain nutrient-rich anaerobic conditions that will promote the long-term bioremediation of a chlorinated solvent or other dense nonaqueous phase liquid (DNAPL) source.

Chitin is the structural component of the shells of crustaceans. Chitin is also present in many other living organisms, such as insects and mushrooms. Because it is present in so many different types of living organisms, chitin is the most plentiful natural polymer next to cellulose.

Chitin is a condensation polymer of N-acetyl-D-glucosamine where minority of the acetyl groups has been lost. Chitosan refers to a deacetylation product obtained from chitin where most of the acetyl groups have been removed. Experimentally, chitosan can be distinguished from chitin because of its solubility in dilute acetic or formic acid. Also, chitin contains less than 7% nitrogen, while chitosan contains 7% or more nitrogen. The amino groups of chitin and chitosan are exceptionally stable in 50% sodium hydroxide, even at high temperature. Glucosamine occurs as an essential part of the polymer structure. Elemental analysis of chitin samples reveal that they bind water tenaciously. This is consistent with the general picture of chitin structure as a chain of N-acetylglucosamine punctuated by free glucosamine units with considerable amounts of trapped water as part of the molecule.

Chitin and chitosan are both biodegradable and non-toxic, and they have binding properties such that they function as excellent flocculants for clarifying liquids, help heal wounds, can be fabricated into strong permeable films, and function as drug-delivery gels for topical application of a variety of medicaments. It has also been determined that chitin may be used as an electron donor in bioremediation of contaminants in the environment.

In view of the foregoing, it will be appreciated that providing a process combining fracturing technology with use of solid-phase or other nonaqueous-phase treatment agents for remediation of environmental contamination in subsurface soils would be a significant advancement in the art.

BRIEF SUMMARY OF THE INVENTION

It is a feature of the present invention to provide a method for remediation of environmental contamination in subsurface soils comprising emplacing solid-phase or other nonaqueous-phase treatment agents using soil fracturing technology.

It is another feature of the invention to provide a method for environmental bioremediation of chlorinated source areas in low permeability media comprising the use of chitin in connection with fracturing technology.

It is still another feature of the invention to provide a method for treating groundwater contaminated with plumes of contamination by placing a treatment zone in the path of the plumes such that contaminants in the plumes are degraded to nonhazardous materials.

These and other features of the invention can be addressed by providing a method for increasing remediation of a contaminated subsurface formation, the method comprising:

(a) fracturing the subsurface formation to result in a network of fractures in the formation; and (b) simultaneously injecting an aqueous slurry comprising an optional proppant and a solid-phase or nonaqueous-phase treatment agent into the network of fractures.

In an illustrative embodiment of the invention the fracturing and injecting steps are carried out by hydraulic fracturing, ultrasound, pulse injection, pneumatic fracturing, jet injection, or combinations thereof, or other procedures known in the art. The method can be carried out in low permeability formations, where a proppant would likely be used, or in high or moderate permeability formations, where a proppant may or may not be necessary.

Where the contaminant being treated is a chlorinated solvent, the solid-phase or nonaqueous-phase treatment agent comprises an electron donor for increasing anaerobic reductive dechlorination of the chlorinated contaminant. An illustrative electron donor comprises chitin, but other electron donors may also be used.

Another illustrative embodiment of the invention comprises a method for treating groundwater comprising a plume of contamination in a subsurface formation, the method comprising:

(a) determining the size, depth, and direction of movement of the plume of contamination in the subsurface formation;

(b) creating a treatment zone configured for intercepting the plume of contamination, comprising
 (1) fracturing the subsurface formation to result in a network of fractures in the formation, and
 (2) simultaneously injecting an aqueous slurry comprising an optional proppant and a solid-phase or nonaqueous-phase treatment agent into the network of fractures; and (c) monitoring conversion of one or more contaminants in the plume of contamination into one or more non-hazardous products.

Still another illustrative embodiment of the invention comprises a method for increasing anaerobic reductive dechlorination in a chlorinated source area in a low permeability formation comprising:

(a) fracturing the low permeability formation to result in a network of fractures in the formation; and (b) partially filling the network of fractures with an aqueous slurry comprising an optional proppant and a solid phase electron donor.

DETAILED DESCRIPTION

Figure 1:
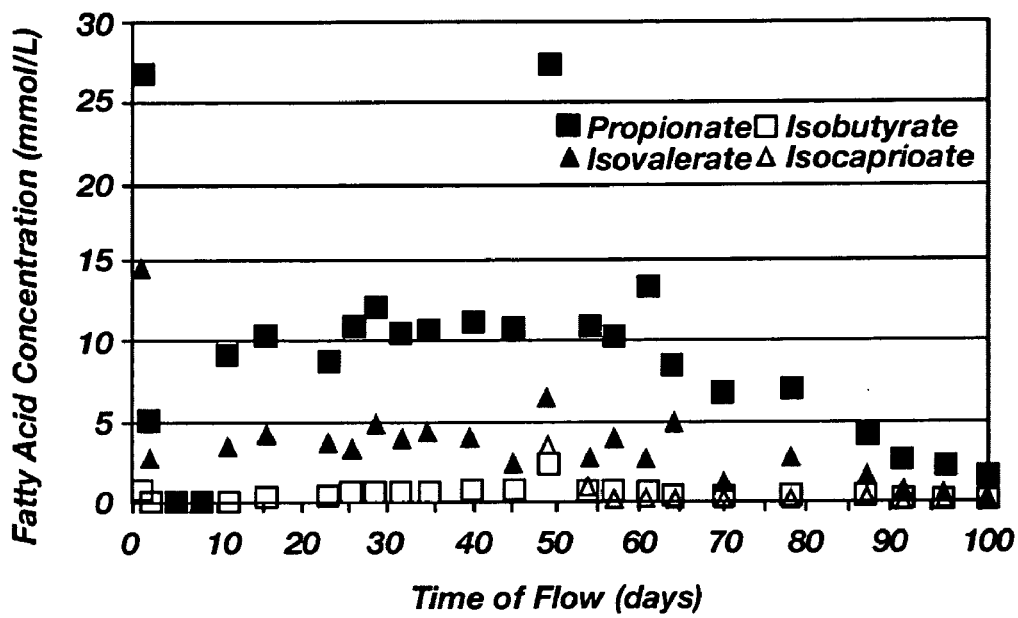
FIG. 1 shows electron donor production from chitin fermentation observed in the effluent of a continuous-flow chitin column (Brennan et al., 2001).

Before the present methods for remediation of subsurface environmental contamination using soil fracturing for emplacing solid-phase and nonaqueous-phase treatment agents are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. For example, reference to injecting "a treatment agent" includes reference to injecting two or more of such treatment agents, reference to injecting "an aqueous slurry" includes reference to injecting one or more of such aqueous slurries, and reference to "the electron donor" includes reference to two or more of such electron donors.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of."

As used herein, "consisting of" and grammatical equivalents thereof exclude any element, step, or ingredient not specified in the claim.

As used herein, "consisting essentially of" and grammatical equivalents thereof limit the scope of a claim to the specified materials or steps and those that do not materially affect the basic and novel characteristic or characteristics of the claimed invention.

The present invention relates to emplacement of solid-phase or other nonaqueous-phase treatment agents using soil fracturing technology. Such treatment agents can be of various types, including solid-phase carbon or nutrient sources, abiotic treatment agents, combined abiotic/biological treatment agents, high-viscosity liquids or semi-solids, and the like. Illustrative solid-phase carbon or nutrient sources include chitinaceous materials, such as shell or shell derivatives, refined chitin, chitosan, and other chitin-bearing materials; cellulose-containing materials, such as plant derivatives (e.g., corn cob waste, sawdust) and paper derivatives; and sugar- or starch-containing solids, such as whey powder, food derivatives (e.g., sugar beet wastes, potato wastes, etc.), sugars or sugar complexes, and DARA-MEND® and TERRAMEND® brand products (Adventus Americas Inc., Bloomingdale, Ill.). Illustrative abiotic treatment agents include reactive metals or metal complexes, such as zero-valent iron (including "nanoscale" or powdered iron) and bimetallic iron (including bimetallic nanoscale iron); and oxidants, such as permanganates (potassium or sodium) and persulfates. Illustrative combined abiotic/biological treatment agents include EHC™ brand product (Adventus Americas, Inc., Bloomingdale, Ill.). Illustrative high viscosity liquids or semi-solids include HRC®, ORC®, HRC-X™, and MRC™ brand products (Regenesis, San Clemente, Calif.), vegetable oils, and molasses.

Hydraulic fracturing is a process whereby a fluid is pumped into a borehole at a rate and pressure high enough to overcome the in situ confining stress and the material strength of a formation (i.e. soil or rock) resulting in the creation of a fracture. This process has been used for decades to enhance oil and gas production rates in wells where it would otherwise be uneconomical. When a hydraulically fractured well is produced, the induced fractures provide a conduit so that fluids can flow to the well at a greater rate than would otherwise be possible. The fractures also extend the "reach" of a well, such that an area can be drained with a smaller number of wells. In practice, a slurry mixture containing a proppant (sand) and a viscous fluid (guar gum and water mixture) is pumped under pressure into subsurface soils to create a fracture. After pumping, the sand holds the fracture open while an enzyme or chemical additive breaks down the viscous fluid. The fluid subsequently drains out of the fractures, leaving only sand in the induced fractures.

The present process, based on the hydraulic fracturing techniques described above, was developed specifically for geo-environmental applications in unconsolidated, low permeability sediments. Fracturing may be conducted using proprietary down-hole fracturing equipment designed for various soil types at shallow depths and low operating pressures (typically that of overburden pressure). Fracturing may also be conducted using equipment well known in the art. The resulting network of sand-filled fractures that is created enables the expeditious recovery or in situ treatment of subsurface contaminants. The instant process can also be used for incorporating biological amendments with the sand slurry to distribute these amendments in contaminated soils while simultaneously enhancing soil permeability.

EXAMPLE 1

Site Background. The Distler Brickyard Site (located outside Louisville, Ky.) contains the chlorinated aliphatic hydrocarbon (CAH) TCE at concentrations above the maximum contaminant level in groundwater. The presence of reducing conditions and less chlorinated degradation products cis-1,2-dichloroethene (cis-1,2-DCE), vinyl chloride (VC), and ethene indicated that biodegradation via anaerobic reductive dechlorination (ARD) was occurring naturally in the system. However, the rate and extent of ARD appeared to be limited by a lack of available electron donor. For this reason, a remediation technology that enhanced natural ARD via electron donor addition was hypothesized to be a viable method for reducing CAH concentrations to acceptable levels.

Remediation of CAHs at the Distler Site presented a number of challenges: (1) contamination was present in low permeability sediments, (2) the zone of contamination was variably saturated depending on seasonal changes in precipitation, and (3) available funding for remediation was limited. To deal with these challenges, a low-cost, low-maintenance remedy that was effective under variably saturated conditions was required. The instant invention was conceived, which uses a solid phase electron donor emplaced as a sand-slurry mixture into the formation using the process described above. In this particular application, chitin (JRW Technologies, Inc., Lenexa, Kans.) was incorporated with the sand in the fractures as an electron donor for ARD of CAHs.

The use of chitin in this application was an attractive approach because it potentially addresses all of the constraints presented above. Once emplaced in the formation, the chitin was degraded slowly, producing a relatively long-lived source of nitrogen and electron donor in the form of volatile fatty acids (VFAs) for ARD. Chitin was effective under the variably saturated conditions of this unique system; significant concentrations of VFAs were released only when the chitin was saturated, the same conditions under which CAHs are mobilized and must be degraded. Under unsaturated conditions, VFA production was slowed, thus the electron donor was available only when necessary and the longevity of chitin in the subsurface was maximized. Finally, the use of chitin was also attractive due to its availability and cost. Chitin is the most plentiful natural biopolymer in the world next to cellulose and thus is available at a low cost.

Methods. Column studies were performed to evaluate the ability of chitin to enhance the dissolution and dechlorination of PCE. Continuous-flow and semi-batch columns packed with chitin and sand were used to evaluate chitin as a potential carbon source for the remediation of both dissolved and DNAPL sources of PCE. The following anaerobic cultures were added to the columns used to evaluate ARD: the pure culture, Desulfuromonas strain BB1, which reductively dechlorinates PCE to cis-DCE (F. E. Löffler, J. Li, J. W. Urbance, and J. M. Tiedje, in Abstracts of the 98th General Meeting of the American Society for Microbiology (American Society for Microbiology, Washington, D.C. 1998); a mixed culture enriched from Sangamon River sediments (Piatt County, Ill.), also capable of reducing PCE to cis-DCE; and a mixed culture enriched from Copper Slough sediments (Champaign County, Ill.), capable of reducing PCE to VC. Methods for the analysis of chloroethenes, methane, and VFAs have been presented previously (R. A. Brennan, R. A. Sanford, and C. J. Werth, Evaluation of a Halorespiration Enhancing Redox Transition Zone (HERTZ) Technology for Bioremediation: Column Studies, Submitted to Environ. Sci. Technol., 2001).

To evaluate the effects of groundwater flow on the fermentation of chitin and the dissolution of PCE without dechlorinating cultures, experiments were performed in a continuous flow column system (Brennan et al., supra). The first column (chitin column) was packed with a mixture of 27.3-g chitin and 375.6-g sand, giving a ratio of chitin to sand of approximately 1:14 by mass. The second column (DNAPL column) was packed with sand and loaded with neat PCE to achieve a residual DNAPL saturation of 15%. The third and fourth columns were packed with sand only. After column preparation, groundwater was pumped through all four columns in series at a rate of 0.14 ml/min, giving retention times of 1, 0.5, 0.5, and 2 days for the first, second, third, and fourth columns, respectively (4 days cumulative retention time for the entire system). An identical set of columns without chitin served as a control to evaluate the dissolution of PCE in the absence of chitin. Aqueous samples were collected from the end of each column every 3 to 5 days and analyzed for $CH_4$, H2, pH, VFAs, and chloroethenes. The columns were evaluated over a period of 101 days.

To uncouple the effects of chitin loading concentrations and groundwater conditions on the degradation of PCE, a series of experiments in semi-batch columns was performed. For each experiment, a column containing chitin (i.e., chitin column) was connected in series with another column containing PCE (i.e., PCE column). The chitin columns were packed with a mixture of sand, limestone, and chitin to yield mass ratios of chitin:sand of 1:10 and 1:5. The PCE columns were packed with sand, dechlorinating cultures, and PCE. The PCE was added to the columns either at the beginning of the experiment as neat PCE (1% residual), or during each sampling event from a stock solution to give a final concentration of 2.5 mg/L in the PCE column. Groundwater was pushed through the columns every 2 days using a piston pump to exchange 1 pore volume. The water collected from the end of all PCE columns was tested for pH, VFAs, and chloroethenes. The columns were evaluated over a period of 30 days.

Figure 2:
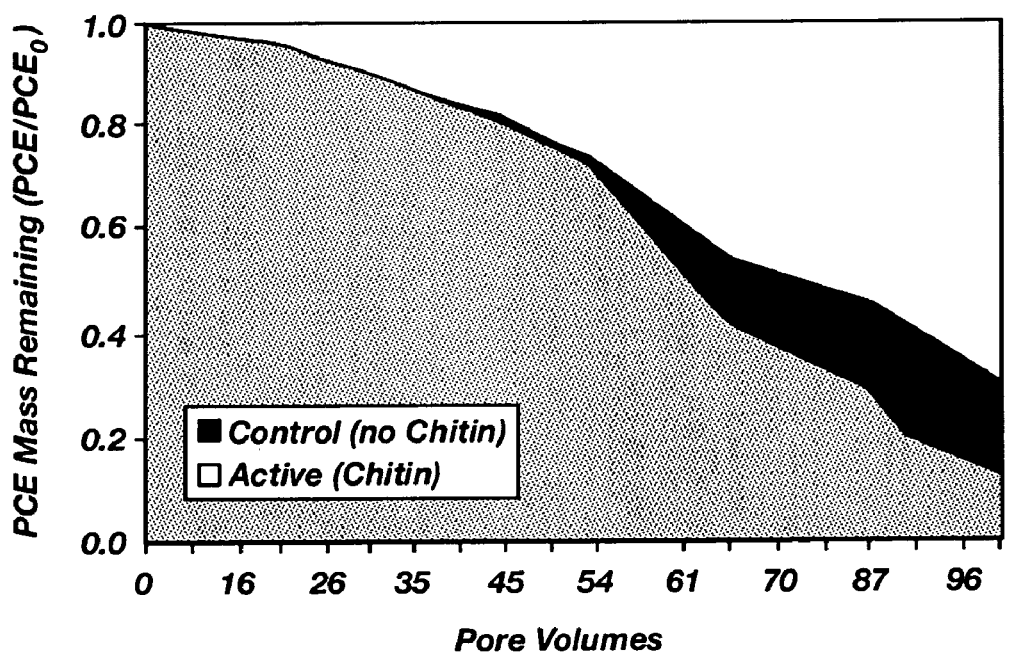
FIG. 2 shows PCE mass remaining in the continuous-flow DNAPL column, indicating enhanced dissolution in the presence of chitin fermentation products (Brennan et al., 2001).

Results and Discussion. The laboratory column studies were performed to evaluate the ability of chitin to enhance the dissolution and biodegradation of PCE. The non-dechlorinating continuous columns were used to evaluate whether chitin fermentation products enhanced the dissolution of PCE. As shown in FIG. 1 by the production of VFAs, an active, fermentative microbial community was readily apparent throughout the continuous-flow column experiment. The dominant VFA produced during chitin fermentation was propionate, with an average concentration of 9.3 mM in the chitin column effluent throughout the entire experiment. Other VFAs produced were isovalerate, isobutyrate, and isocaprioate, with average concentrations throughout the experiment of 3.3, 0.6, and 0.5 mM, respectively. Acetate and succinate were also detected, although at much lower concentrations, and only for brief periods. VFAs like isovalerate (with seven carbons) have the potential to act as surfactants with PCE and increase dissolution rates (W. D. Ellis, W. D., J. R. Payne, A. N. Tafuri, and F. J. Freestone, EPA/600/D-84-039 (U.S. Environmental Protection Agency, Cincinnati, Ohio 1984); R. Martel, P. J. Gelinas, J. E. Desnoyers, and A. Masson, 31 Ground Water 789–800 (1993). FIG. 2 shows that in the presence of chitin fermentation products, dissolved PCE concentrations in the effluent of the active DNAPL-column were greater than in the control column (without chitin). After 101 days, 34.7% more PCE mass was dissolved out of the active column than out of the control. These results indicate that the chitin was having a surfactant-like effect and was enhancing the dissolution of PCE. The implication of this observation is that the use of chitin during bioremediation of chlorinated solvent source areas may significantly reduce the time frame required for remediation.

Propionate has the potential to be an excellent electron donor for reductive dechlorination since it is typically oxidized to acetate and hydrogen under low hydrogen partial pressures. Dechlorinating bacteria are known to be excellent hydrogen consumers capable of maintaining the low hydrogen concentrations required to make propionate oxidation thermodynamically favorable. F. E. Löffler, J. M. Tiedje, and R. A. Sanford, 65 Appl. Environ. Microb. 4049–4056 (1999). The mass of propionate produced during this experiment was theoretically enough to reduce all of the PCE DNAPL to ethene (assuming an electron donating capacity of 12 electrons per mole propionate). The presence of methane indicated that the system conditions were indeed favorable for reductive dechlorination of PCE. Mass balance calculations revealed that 94.7% of the chitin as carbon had been degraded into VFAs (93.8%) and methane (0.9%) by the end of the experiment. Thus, not only was DNAPL dissolution enhanced in the absence of dechlorinating cultures, but the conditions necessary for dechlorination were established.

Figure 3:
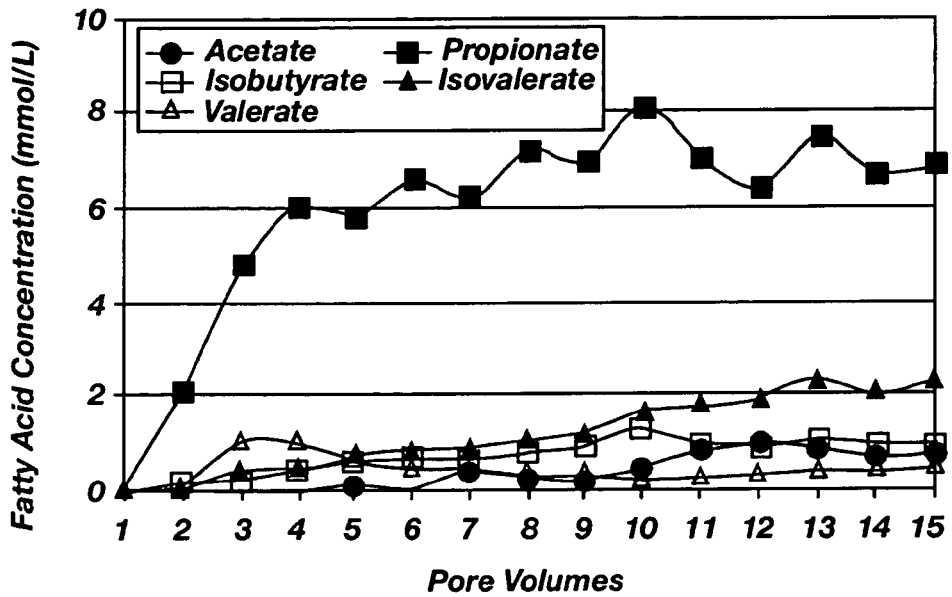
FIG. 3 shows electron donor production observed in the effluent of a semi-batch column containing chitin at a ratio of 1:5 with sand.

Semi-batch columns were used to evaluate the ability of chitin to support dechlorination. Natural groundwater was exchanged in the semi-batch columns for a total of 15 pore volumes. By the second pore volume, VFAs concentrations were observed to increase in all columns. FIG. 3 illustrates a typical VFA profile from the effluent of a semi-batch column containing chitin at a ratio of 1:5 with sand. For all columns, propionate was the dominant fatty acid produced, with concentrations generally sustained between 2–6 mM and 6–10 mM for chitin:sand ratios of 1:10, and 1:5, respectively. In addition to propionate, isovalerate, valerate, isobutyrate, acetate, and lactate were also detected, but at lower concentrations (<2 mM).

Figure 7:
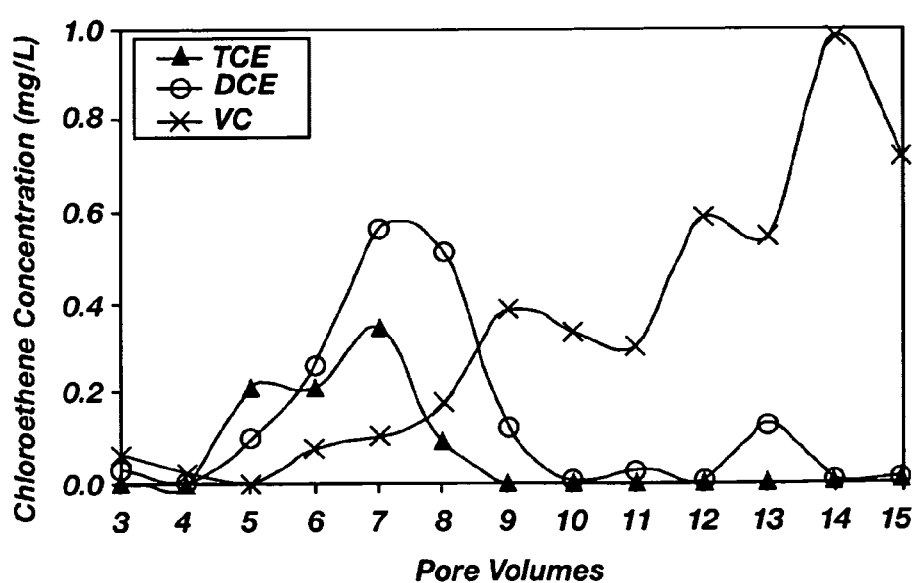
FIG. 7 shows dechlorination products observed in the effluent of a semi-batch column loaded with chitin at a ratio of 1:10 with sand and fed 2.5 mg/L PCE.

Chitin fermentation products supported dechlorination activity in all of the semi-batch columns containing dechlorinating cultures. PCE was reduced to trichloroethene (TCE), cis-dichloroethene (DCE), and vinyl chloride (VC) in these experiments. The lack of complete dechlorination to ethene was simply a function of the capabilities of the supplementary dechlorinating cultures used. It is expected that if supplementary cultures with VC-degrading ability were inoculated into the columns, ethene production would be supported. The most dechlorination activity was observed in columns containing low concentrations of chitin (1:10) and low concentrations of PCE (2.5 mg/L). This could be due to the lower pH conditions that were observed in columns containing high chitin concentrations. FIG. 7 illustrates the typical dechlorination products observed in the effluent of a semi-batch column fed 2.5 mg/L PCE. Higher VC concentrations at later pore volumes (i.e., at later times) indicate that dechlorination activity increased in the column with time.

The results of the column studies indicated that chitin enhanced the dissolution of PCE and that the products of chitin degradation supported dechlorination. After 15 pore volumes, all of the PCE was dechlorinated to VC. It is expected that complete dechlorination of PCE to ethene would have been supported by chitin fermentation products had a culture capable of VC degradation been used in the columns. Therefore, chitin appears to cost-effectively accelerate clean-up of source areas. Also, the dominant VFA produced from chitin fermentation was propionate, which has been shown to be an excellent electron donor for dechlorination. Further, chitin supported ARD in column studies; the extent of ARD was limited by the degradative ability of the cultures used. Moreover, slow and sustained production of VFAs is a positive indicator for the longevity of chitin in a field setting.

EXAMPLE 2

Methods. Laboratory testing was performed to determine the actual carrying capacity of a fracture slurry comprising 20–40 mesh size chitin and 20–40 API specification frac sand. Blender stall, gelation, and specific gravity testing were performed using several guars and enzyme breaker over a range of pH values until a maximum concentration of pumpable chitin and sand was determined. The basic procedure comprised adding incremental amounts of chitin to the sand slurry in a blender until the solution caused the blender to stall. Based on previous research performed by Vanson HaloSource, Inc. (Redmond, Wash.), chitin was expected to be compatible with the guar slurry. For this reason, no additional compatibility testing studies were performed.

Results and Discussion. Previous laboratory testing conducted by Vanson indicated that chitin/guar mixtures are compatible and that chitin will not interfere with the functionality of the guar gel. Subsequent laboratory studies indicated that chitin and sand could be successfully incorporated into a base gel to form a fracture slurry. As shown in Table 1, the recommended upper limit concentrations of chitin mixed with each of: plain tap water, hydroxypropyl guar (HPG) base gel, and HPG containing 20–40 frac sand are 65 kg, 55 kg, and 45 kg, respectively. The maximum recommended chitin to sand ratio achieved in laboratory testing was 1 to 4. The incorporation of chitin appeared to be limited by its significant surface area, the large amount of 20–40 chitin particles, and low specific gravity. These characteristics give the chitin a large absolute volume, which limits the mass of chitin that can be mixed in liquid slurry. Given that the maximum chitin to sand ratio achieved in laboratory testing was 1 to 4, an operational ratio for chitin to sand of 1 to 5 was recommended for at least the first fracture initiated in the field. This corresponded to 100 lbs. of chitin and 500 lbs. of sand in a typical 250-gallon batch of fracture slurry.

TABLE 1

| Mixture Tested | Mass Chitin (kg) | HPG Base Gel (Liters) | Tap Water (Liters) | Mass Sand (kg) |
|---|---|---|---|---|
| Chitin with Tap Water | 65 | None | 1000 | None |
| Chitin with HPG Base Gel | 55 | 1000 | None | None |
| Chitin with HPG Base Gel and 20–40 Frac Sand* | 45 | 1000 | None | 200 |

*Chitin to sand ratio of approximately 1:4.

Therefore, chitin can be incorporated easily into the present process. These laboratory studies indicated that the maximum mass ratio of chitin to sand that the slurry solution can accommodate is 1:4.

EXAMPLE 3

Methods. A field test was designed and conducted in the suspected CAH source area (FIG. 4) to determine if chitin could be emplaced into a low permeability formation using the present process. The location of the pilot test was moved from the original location down gradient of the source area to the source area due to higher water levels observed in the source area at the time of the monitoring well installation. The basic components of the field test comprised the following: (1) well installation, (2) pre-fracturing slug testing, (3) pre-fracturing baseline sampling, (4) fracturing and chitin emplacement, (5) tiltmeter monitoring during fracturing, (6) post-fracturing slug testing, (7) pumping test, and (8) post-fracturing monthly groundwater monitoring.

Figure 4:
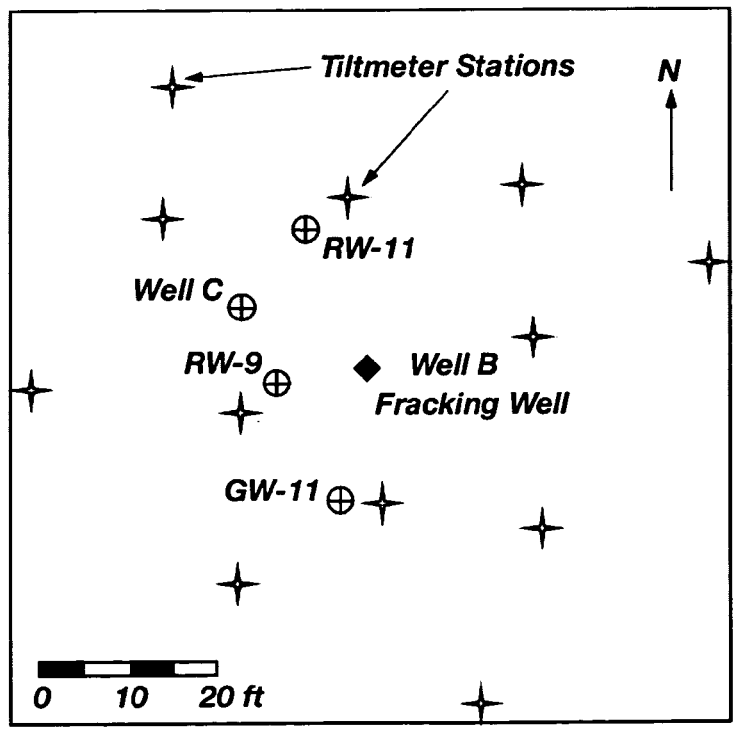
FIG. 4 shows a map of source area well locations at the Distler Brickyard Site located outside Louisville, Ky.

Hydraulic fracturing and chitin emplacement were conducted in a single well, Well B, which was drilled as part of the fracturing activity (FIG. 4). Three fracture zones were created at the following depths below ground surface in Well B: FWB-1 (25 ft), FWB-2 (33 ft), and FWB-3 (38 ft) (FIGS. 2 and 3).

The first fracture (FWB-1) was initiated in silty sand at a depth of 25 ft below the ground surface. There was some uncertainty as to the integrity of the seal created in the borehole due to the dense soil conditions encountered at this depth. Approximately 250 gallons of fracture slurry were pumped at FWB-1, of which approximately 200 gallons were placed as a discrete fracture.

Figure 6:
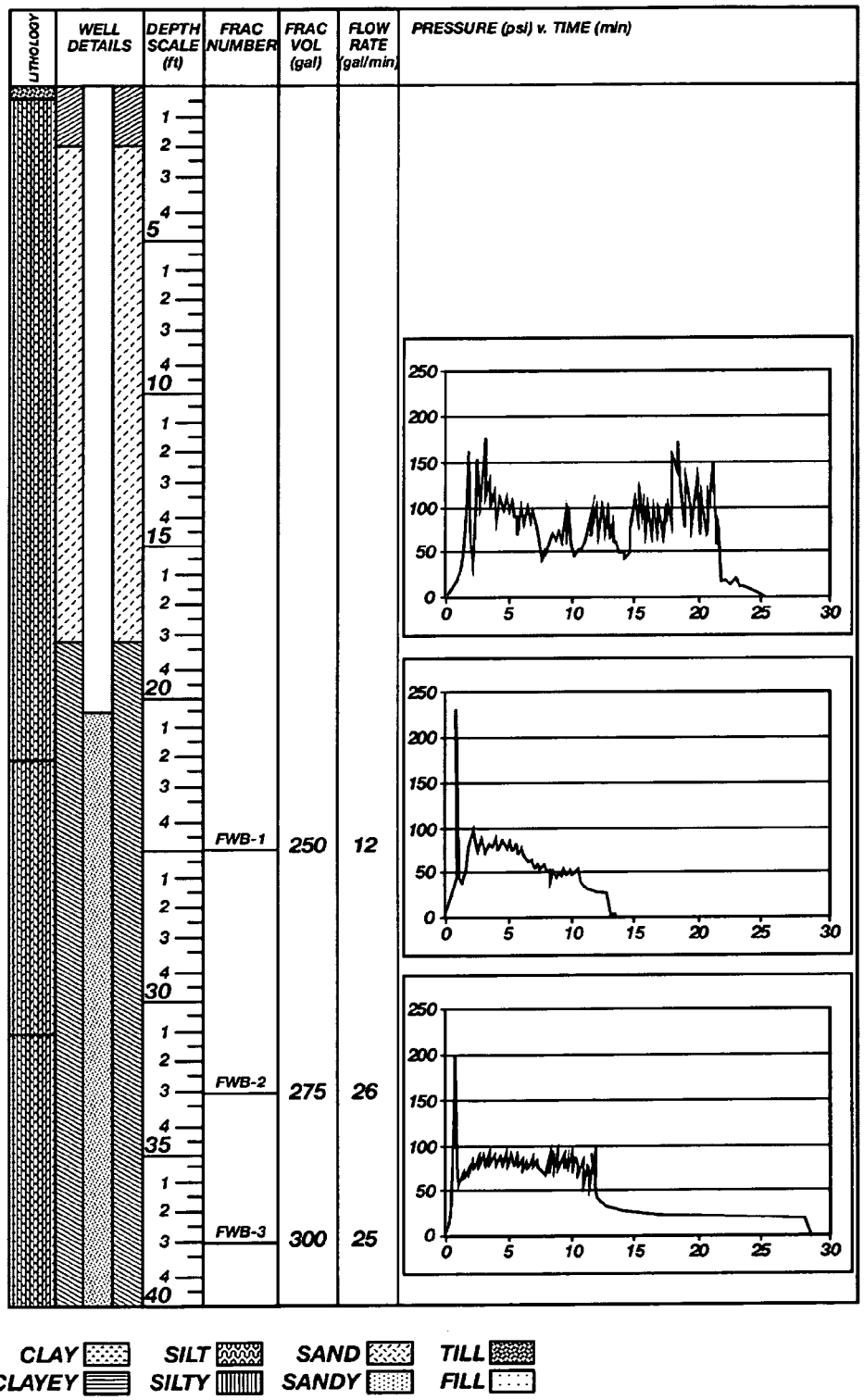
FIG. 6 shows a well log (partial) for Well B showing the locations of the three fracture zones and the pressure-time plots for each fracture.

It is estimated that no more than 50 gallons of fracture slurry leaked to the surface through an annular vent to the borehole. The unadjusted (for losses) fracture initiation pressure was 180 psi at an average fracture slurry pumping rate of 12 gpm. Pressure monitoring indicated that some pump cavitation occurred during pumping, perhaps due to the low pumping rate (FIG. 6). The amount of chitin and sand successfully placed in the fracture is estimated to be 80 lbs and 400 lbs respectively (Table 2).

Soil fracturing was commenced at FWB-2 in clay soils at a depth of 33 ft below the ground surface. It was decided to incorporate slightly more sand (550 lbs) in the fracture slurry because of the greater than expected carrying capacity of the base gel observed during the first batch mix. Incorporation of the extra sand resulted in a total batch mix of 275 gallons of fracture slurry for FWB-2. This entire volume of fracture slurry was successfully pumped into the clay soil without any leakage. The unadjusted fracture initiation pressure for FWB-2 was 235 psi at an average slurry-pumping rate of 26 gpm. The slurry-pumping rate was increased relative to that of FWB-1 in order to reduce the risk of pump cavitation. Pressure monitoring indicated a relatively constant fracture propagation pressure of 75 psi, which gradually declined to 50 psi near the end of pumping (FIG. 6). The amount of chitin and sand successfully placed in the fracture was estimated to be 100 lbs and 550 lbs respectively (Table 2).

The final fracture (FWB-3) was initiated in clay soil at a depth of 38 ft below the ground surface. The amount of sand and chitin incorporated into the fracture slurry was again increased to take advantage of the carrying capacity of the base gel. The resulting fracture slurry was noticeably thicker than previous batches formulated. A total volume of 300 gallons of fracture slurry was successfully pumped into the clay soil without any loss of slurry due to leakage. The unadjusted fracture initiation pressure for FWB-3 was 200 psi. The fracture propagation pressure was a constant 75 psi during the pumping event (FIG. 6). The amount of chitin and sand successfully placed in the fracture was estimated to be 145 lbs and 600 lbs respectively (Table 2).

TABLE 2

| Fracture no. | Depth (ft bgs) | Peak Pressure (psi) | Soil Type | Chitin:Sand Placed (lbs) | Placement Efficiency (%) |
|---|---|---|---|---|---|
| FWB-1 | 25 | 180 | silty sand | 80:400 | 80 |
| FWB-2 | 33 | 235 | silty clay | 100:550 | 100 |
| FWB-3 | 38 | 200 | silty clay | 145:600 | 100 |

Geophysical and hydrologic monitoring were used to determine the effective radius of the fracturing and the effect of the fracturing process on the permeability and connectivity of the formation. Geophysical monitoring comprised the use of an array of tiltmeter monitoring stations to infer the radius of influence of the fracturing. Hydrologic monitoring comprised the use of slug tests and a pumping test to measure changes in aquifer permeability and connectivity due to the fracturing.

Remote monitoring of fractures using tiltmeter geophysics was used to collect the geophysical data necessary to model the orientations and geometry of the individual fracture zones. Tiltmeters are highly sensitive instruments (microradian resolution) used to measure the minute ground surface deformations created during the fracturing process. The direction and magnitude of ground surface deformation ("tilt") measured by tiltmeters was used to determine the shape, thickness, effective radius, and orientation of fractures in the subsurface. Fracture mapping was conducted using surface-mounted ES Model 700 biaxial tiltmeters. An array of 12 tiltmeter stations surrounding the fracturing well (Well B) was used (FIG. 4).

Prior to fracturing, tiltmeters were aligned along north-south axis and electronically leveled. Tiltmeter input parameters (soil rheological constants, depth, spacing, etc.) were entered into a laptop computer and connected to the tiltmeters using cables. Data loggers were set to continuously record data approximately 30 minutes prior to each fracturing event to obtain a baseline signature and during each fracturing event to characterize the orientation and geometry of each of the newly created fractures. Tiltmeter signal data were modeled using geophysics based on analyses of soil stress, strain, and displacement induced by a sand-filled fracture intrusion into soils. The analyses were based on equations presented in X.-M. Yang & P. M. Davis, Deformation Due to a Rectangular Tension Crack in an Elastic Half-Space, 76 Bulletin of the Seismological Society of America 865–881 (1986).

Pre- and post-fracturing slug tests were performed in Well C to determine whether fracturing enhanced the permeability of the formation in the Well C area. The slug tests were performed by adding a slug of deionized water to Well C and monitoring the fall in water level over time using electronic water level indicators. The tests were complete when the water level returned to its pre-test level. In the pre-fracturing test (conducted in October 2001), 3 gallons of deionized water were added to Well C, which produced an approximately 0.6 ft increase in water level. In the post-fracturing test (conducted in January 2002), 4 gallons of deionized water were added which produced an approximately 3 ft increase in water level. Hydraulic conductivity values were derived from the results of the slug tests using the AQTESOLV software program; the system was modeled as an unconfined aquifer using the Bouwer and Rice solution. H. Bouwer & R. C. Rice, A Slug Test for Determining Hydraulic Conductivity of Unconfined Aquifers with Completely or Partially Penetrating Wells, 12 Water Resources Research 423–428 (1976).

A pumping test was used to assess the connectivity of the fracturing well (Well B) to the surrounding monitoring wells qualitatively. Well B was pumped intermittently for a period of approximately 5.5 hours (continuous pumping could not be sustained due to the relatively low yield of the formation), and a total of approximately 84 gallons was pumped from Well B. The drawdown and recovery in surrounding monitoring wells GW-11, RW-9, Well C, and RW-11 were monitored using electronic water level indicators.

Groundwater sampling was conducted both prior to (baseline sampling) and following chitin emplacement on a monthly basis. The analytes consisted of electron donor parameters (chemical oxygen demand [COD] and the individual VFAs), redox parameters (nitrate, ferrous iron, sulfate, and methane), and ARD parameters (chloroethenes and ethene, chloroethanes and ethane). Purging was performed using either a disposable bailer or a submersible pump, depending on the maximum achievable flow rate at each well. Where the flow rate was sufficient to sustain pumping (RW-9, RW-11, Well C, and Well B) the pump was used to purge the well. In all cases, the well was pumped dry and allowed to recover slightly to provide sufficient water for sampling. Where the flow rate was not sufficient to sustain pumping (GW-11) a disposable bailer was used for purging. The only exception to this was the January 2002 sampling round; the water level in GW-11 had increased significantly from previous levels and GW-11 was purged using the pump. In all cases, sampling was performed using disposable TEFLON bailers.

Ferrous iron and nitrate analyses were performed in the field immediately after sample collection using field test kits. Sulfate and COD analyses were performed at the end of the sampling week, also using field test kits. H. Bullock, R. A. Wymore, and K. S. Sorenson, Monitoring Enhanced In Situ Bioremediation in a Fractured Basalt Aquifer. Contaminated Site Remediation: From Source Zones to Ecosystems, Proceedings of the 2000 Contaminated Site Remediation Conference 217–224 (C. D. Johnston ed., Centre for Groundwater Studies, Wembley W. A., Australia, 2000); K. S. Sorenson, Intrinsic and Enhanced In Situ Biodegradation of Trichloroethene in a Deep, Fractured Basalt Aquifer (Ph.D. Dissertation, University of Idaho 2000). VFA analyses were performed by University of Illinois at Urbana-Champaign as described in Brennan et al., supra. Chloroethene and ethene/ethane/methane analyses were performed by the U.S. EPA laboratory in Athens, Ga., using standard methods (GC-MS and GC-FID, respectively).

Results and Discussion. The results of fracture mapping to determine fracture orientation and geometry are presented based on analysis of tiltmeter geophysical data. The collection of these data was made possible by additional funding provided by the U.S. EPA's Technical Support Project (National Exposure Research Laboratory, Las Vegas, Nev.). Tilt vectors measured at each tiltmeter station were used to model each fracture as a discrete planar feature. A three dimensional representation of the modeled fractures is presented in FIG. 5. Pressure-time plots (shown in FIG. 6) and slurry flow rate data were likewise considered in the interpretation of the tiltmeter data. These results are summarized in Table 3.

Fracture FWB-1 was modeled as a single planar fracture dipping at an angle ("dip angle" or "dip") of 78 degrees from the horizontal. It exhibited an effective fracture radius of approximately 3.0 ft. and was interpreted to be 1.2 in. in thickness. The azimuth of the fracture plane (i.e. direction perpendicular to the dip direction) was 158 degrees. This fracture was the smallest of the three fractures placed, and also the most steeply inclined relative to the horizontal. The fracture appeared initially to propagate through the silty sand formation, and then partially intersected the borehole above the fracturing tool. This resulted in some slurry leak-off into the borehole annular space resulting in a smaller than predicted fracture.

Fracture FWB-2 was modeled as a single, shallowly dipping, planar fracture having a dip angle of 22 degrees from the horizontal, an effective fracture radius of 13.9 ft., and a thickness of 0.9 in. The azimuth of the fracture was 106 degrees. Fracture FWB-2 was the largest of the fractures placed. The tilt vector signature during fracture initiation and propagation in the silty clay soils appeared consistent with that of a predominantly horizontal fracture. The pressure-time data did not indicate any slurry leakage.

Fracture FWB-3, initiated in silty clay soils, was also modeled as a single, shallowly dipping, planar fracture. Its dip angle of 32 degrees from the horizontal was more than that of FWB-2 but the fracture was predominantly horizontal. Its effective fracture radius was 12.7 ft., and it exhibited a fracture thickness of 1.4 in. The azimuth of the fracture was 101 degrees. Fracture FWB-3 was an intermediate sized fracture. Its tilt vector signature during fracture initiation and propagation in the silty clay soils appeared consistent with that of a predominantly horizontal fracture. Its configuration and pressure-time plot signature were similar to that of FWB-2, which was also initiated in silty clay soils.

Figure 5:
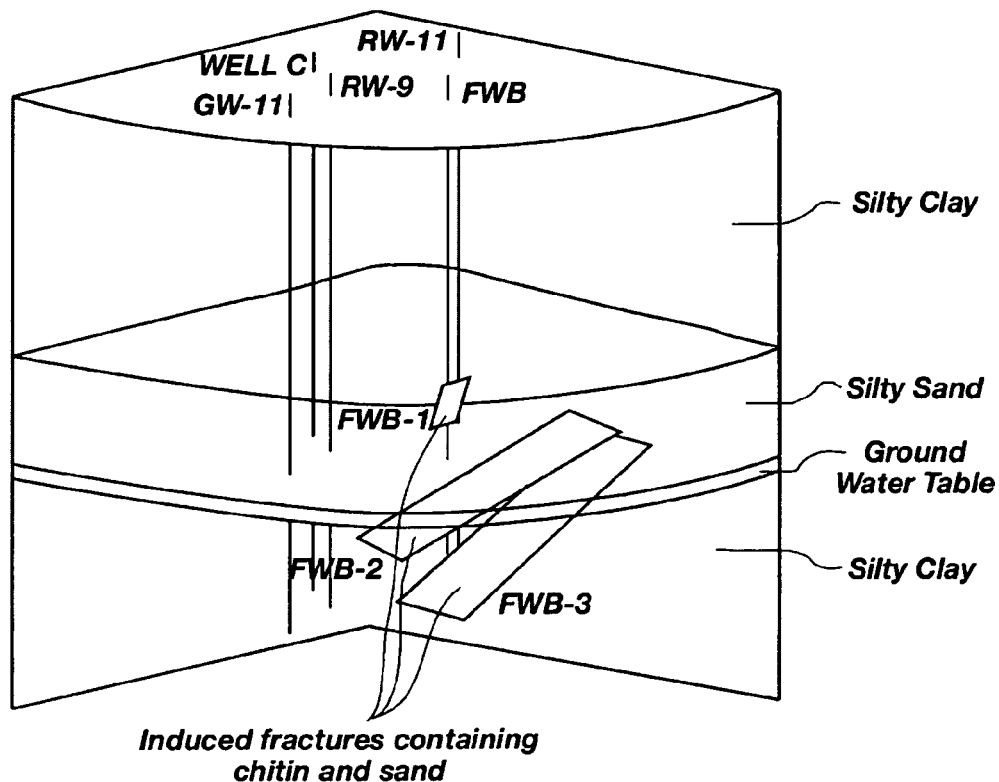
FIG. 5 shows a three-dimensional representation of fractures in subsurface based on tiltmeter modeling.

FIG. 5 is a three-dimensional representation of the fractures in the subsurface based on the tiltmeter modeling results. As is indicated in FIG. 5, FWB-1 is much more steeply dipping and has a much smaller radius of influence than the other two fractures. This is because FWB-1 was initiated in the silty sand unit while FWB-2 and FWB-3 were initiated in the underlying silty clay unit. Also, FWB-2 and FWB-3 have similar azimuth bearings (106 and 101 degrees, respectively) while FWB-1 has an azimuth of 158 degrees, indicating that the propagation direction of the fractures in the two units was different. These results make the point that the propagation of fractures (direction and distance from initiation point) is influenced by the soil fabric and in situ soil stress conditions (degree of consolidation). This is a factor that must be included in the design of future fracturing activities at the site to achieve the required distribution of electron donor in the subsurface.

TABLE 3

| Fracture and Depth | Fracture Fluid Volume (gallons) | Dip Angle (degrees) | Fracture Azimuth (degrees) | Fracture Thickness (in.) | Effective Fracture Radius (ft) |
|---|---|---|---|---|---|
| FWB-1 (25 ft) | 250 | 78 | 158 | 1.2 | 3.0 |
| FWB-2 (33 ft) | 275 | 22 | 106 | 0.9 | 13.9 |
| FWB-3 (38 ft) | 300 | 32 | 101 | 1.4 | 12.7 |

The results of the pre- and post-fracturing slug tests performed at Well C were compared to determine the effect of the fracturing on the hydraulic conductivity of the formation in the Well C area (FIG. 4), approximately 13 ft from Well B. The hydraulic conductivity values obtained from these slug tests were $1.2 \times 10^{-5}$ cm/sec and $1.1 \times 10^{-4}$ cm/sec for the pre- and post-fracturing slug tests, respectively. These results would appear to indicate that the fracturing process had increased the hydraulic conductivity of the formation by approximately an order of magnitude. However, in the time between the pre-fracturing (October 2001) and post-fracturing (January 2002) tests, the water level in Well C increased by approximately 1.7 ft due to seasonal variations in the water level. In the vicinity of Well C, the stratigraphy consists of a silty clay immediately above the shale bedrock; this silty clay is overlain by a silty sand. In the pre-fracturing test, the water level was only about 0.6 ft above the clay-sand contact, whereas in the post-fracturing test, the water level was about 2.3 ft above this contact. So it is possible that the post-fracturing test was dominated by the response of the sand unit, while the pre-fracturing test represents the combined response of the sand and silty-clay units, which would yield a lower overall hydraulic conductivity. Because of this issue, it is difficult given the available data to determine the effect of the fracturing alone on the hydraulic conductivity of the formation in the Well C area.

The fracturing process creates a network of highly-permeable sand-filled fractures. The propagation of these fractures is influenced by soil matrix properties (e.g. bedding planes) and in situ soil stresses (e.g. degree of consolidation) and thus fractures do not always form as radially symmetrical and horizontal "pancakes" about the fracturing well. To infer the distribution and orientation of these fracture zones in the formation, a pumping test was used in addition to the tiltmeter monitoring. A pumping test was performed to assess the relative connectivity of Well B to the surrounding monitoring wells. Results indicate that each well responded almost immediately to pumping in Well B, suggesting that a network of fractures connects the group of wells to Well B. As described above, tiltmeter modeling results indicated that FWB-1 (25 ft) had an effective radius of 3.0 ft, FWB-2 (33 ft) had an effective radius of 13.9 ft, and FWB-3 (38 ft) had an effective radius of 12.7 ft. Given that the modeled effective radii of the three fractures (up to almost 14 ft) and the distances between Well B and the surrounding monitoring wells (9–15 ft), it is likely that the fracturing at Well B has increased the connectivity among the well network. While it is not possible to separate the effect of the fracturing from that produced by the increased water level from the available slug test data, given the radius of influence of the fractures predicted from the tiltmeter modeling results described above, and the connectivity of all four monitoring wells to Well B as indicated by the pumping test, it is likely that the fracturing process increased the hydraulic conductivity and connectivity in this area of the formation.

Figure 8A:
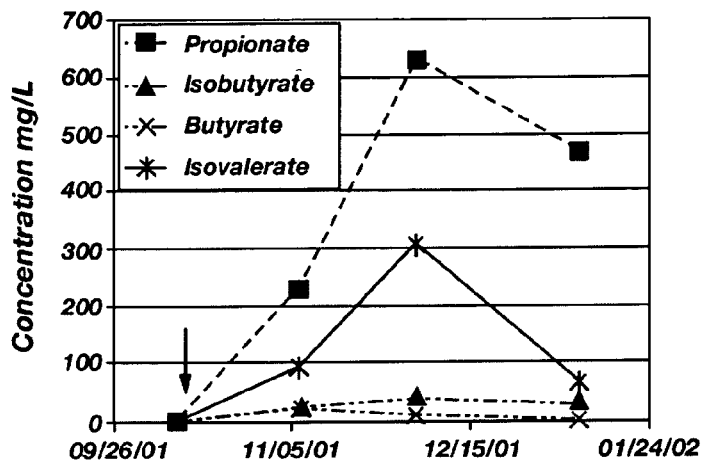
FIGS. 8A–C show electron donors (FIG. 8A), redox conditions (FIG. 8B), and ARD indicators (FIG. 8C) in Well RW-9; the arrows indicate the timing of chitin emplacement.
Figure 9A:
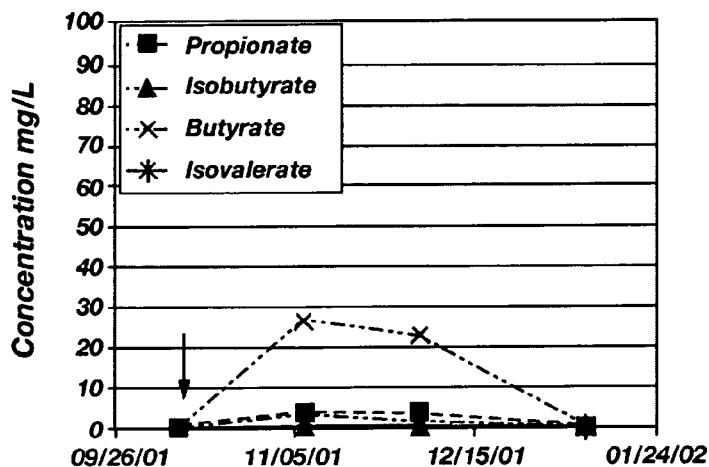
FIGS. 9A–C show electron donors (FIG. 9A), redox conditions (FIG. 9B), and ARD indicators (FIG. 9C) in Well C; the arrows indicate the timing of chitin emplacement.

Concentrations of electron donors to support ARD were monitored using a COD test kit and the concentrations of individual VFAs. FIGS. 8A and 9A present the concentrations of individual VFAs at Wells RW-9 and Well C, respectively. As shown in FIG. 8A, propionate was the dominant VFA observed in RW-9 and was present at a maximum concentration of around 600 mg/L. Isovalerate was also detected at RW-9 at concentrations as high as approximately 300 mg/L. These results are consistent with the laboratory column studies described above in which propionate is the dominant VFA and isovalerate the secondary VFA produced from fermentation of chitin. As seen in FIG. 9A, significant concentrations of VFAs were not present at Well C. Concentrations of butyrate of approximately 25 mg/L were observed in November 2001, but all VFAs had dropped below detection by January 2002. These results indicate that chitin was not distributed to the Well C area during fracturing and that transport of VFAs from chitin-filled fractures to Well C did not occur.

For complete ARD of CAHs such as TCE to proceed to non-chlorinated products, the redox conditions must be very reducing (i.e. methanogenic). Microorganisms obtain energy for new cells and for the maintenance of existing cells through the mediation of oxidation-reduction, or redox, reactions involving the transfer of electrons from an electron donor to an electron acceptor. A. J. B. Zehnder & W. Stumm. Geochemistry and Biogeochemistry of Anaerobic Habitats, in Biology of Anaerobic Microorganisms 1–38 (A. J. B. Zehnder ed., John Wiley and Sons 1988); Pirt, Principles of Microbe and Cell Cultivation (Blackwell Scientific, Oxford 1975); E. J. Bouwer, Bioremediation of Chlorinated Solvents Using Alternate Electron Acceptors, in Handbook of Bioremediation 149–175 (Lewis Publishers, Boca Raton, Fla. 1994). In general, the electron donor is an organic compound, while the electron acceptor is inorganic. Zehnder and Stumm, supra. The free energy yielded by redox reactions varies substantially depending upon the electron acceptor. During respiration, microorganisms will preferentially utilize the electron acceptors yielding the greatest free energy. Bouwer, supra. The order of preference for the most common inorganic electron acceptors is oxygen, nitrate, manganese-IV, iron-III, sulfate, and carbon dioxide. It should be noted that this is based on thermodynamic considerations only and that the kinetics of a given redox reaction can also be important. Zehnder and Stumm, supra. Therefore, the dominant microbial community in a ground water system is largely dependent upon the distribution of electron acceptors. Where oxygen is plentiful, aerobic bacteria will predominate; where oxygen is depleted, but nitrate is plentiful, nitrate-reducing bacteria will predominate; and so on.

Based on the common inorganic electron acceptors listed above, the redox conditions at a site can most easily be evaluated by measuring some subset of the following: (a) dissolved oxygen: non-zero values indicate aerobic conditions, (b) nitrate: non-zero conditions indicate nitrate reduction is not complete, (c) manganese-II: non-zero values indicate reduction of manganese-IV is occurring, (d) iron-II: non-zero values indicate reduction of iron-III is occurring, (e) sulfate: non-zero conditions indicate sulfate reduction is not complete, (f) methane: non-zero values indicate reduction of carbon dioxide (methanogenesis).

Figure 8B:
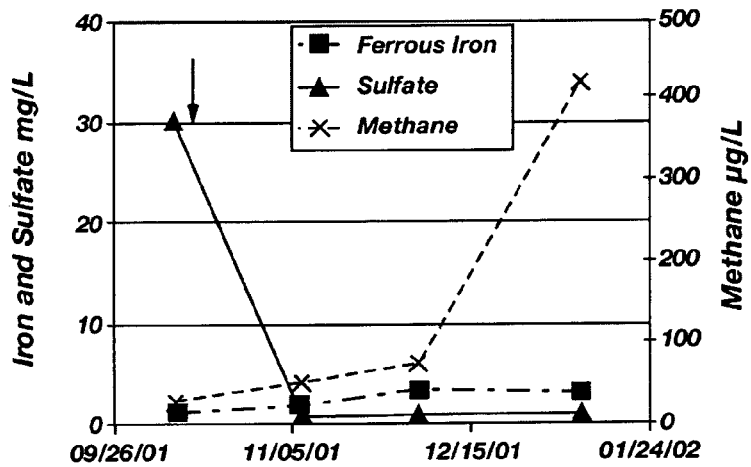

The subset of these parameters used to determine redox conditions at the field site comprised nitrate, ferrous iron, sulfate, and methane. Redox conditions in the fracturing area were determined both before and following the chitin emplacement. As seen in FIG. 8(b), prior to chitin emplacement ferrous iron was present in low but measurable concentrations (approximately 1.3 mg/L), sulfate concentrations were 30 mg/L, and methane was less than 40 µg/L. These data indicate that iron-reducing conditions, not reducing enough for complete ARD of TCE, existed at RW-9 prior to chitin emplacement.

After chitin emplacement, ferrous iron concentrations increased to exceed the range of the analytical method, sulfate concentrations dropped to below detection, and methane increased to almost 450 µg/L (FIG. 8A). These trends indicate the onset of sulfate reduction and methanogenesis in the RW-9 area, suggesting that the presence of VFAs from chitin has resulted in the creation of a geochemical environment conducive to complete ARD of TCE.

Figure 9B:
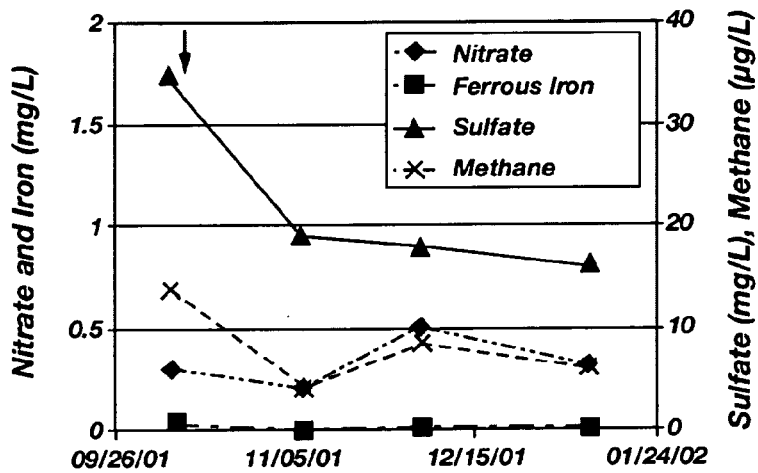

In Well C prior to chitin emplacement, concentrations of nitrate were relatively low (0.3 mg/L), ferrous iron was below detection, sulfate was 35 mg/L, and methane was less than 15 µg/L (FIG. 9B). These data indicate that conditions at Well C were mildly reducing (in the range of nitrate-reducing) prior to chitin emplacement. After chitin emplacement, sulfate did drop to about 16 mg/L; however, nitrate and methane remain consistent with pre-chitin values (FIG. 9B). The presence of sulfate and the absence of methane following chitin emplacement indicate that the redox conditions necessary for complete ARD of TCE were not created in the Well C area. This is not surprising given that significant concentrations of VFAs were not observed at this well.

Figure 8C:
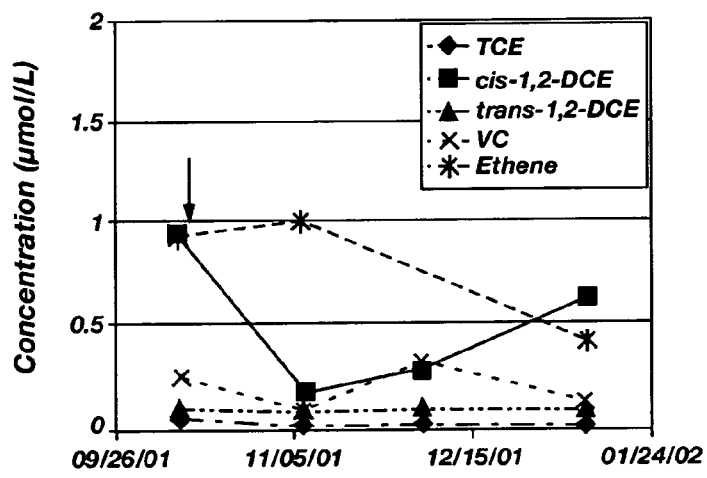

Concentrations of TCE and degradation products cis-1,2-DCE, VC, and ethene were monitored during the field test to determine the effect of chitin emplacement on the ARD of TCE. FIG. 8C presents the concentrations of chloroethenes in RW-9. Prior to chitin emplacement, cis-1,2-DCE was the dominant chloroethene, followed by significant concentrations of ethene and low levels of VC and TCE. The presence of cis-1,2-DCE and ethene at significant concentrations and the absence of TCE indicate that ARD of TCE was already occurring to some extent at this location prior to chitin emplacement. After chitin emplacement, cis-1,2-DCE concentrations dropped and ethene became the dominant compound present, indicating enhanced ARD of cis-1,2-DCE. This is consistent with the drop in sulfate concentrations, which indicate that conditions were becoming favorable for complete ARD of TCE (FIG. 8B). In the last two monitoring rounds, concentrations of cis-1,2-DCE have begun to rebound and ethene has dropped indicating that the enhanced ARD of cis-1,2-DCE may be declining and conditions are shifting back toward pre-chitin conditions. This is consistent with a decrease in the concentrations of VFAs in January 2002 (FIG. 8A).

Figure 9C:
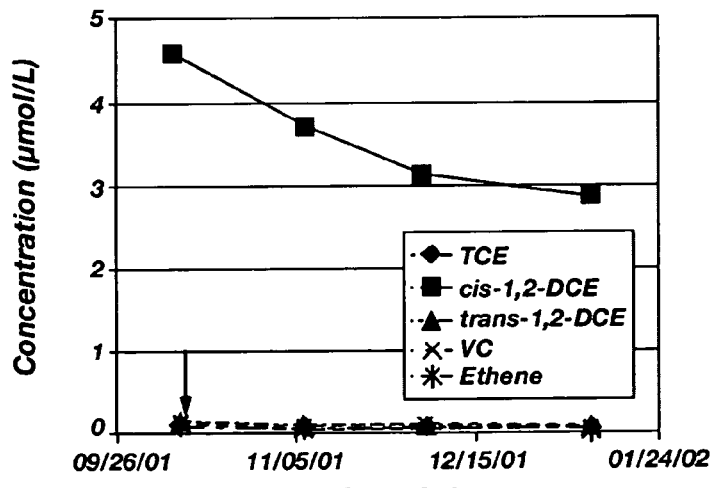

In Well C, cis-1,2-DCE was the dominant chloroethene prior to chitin emplacement; the other chloroethenes were present at relatively low concentrations (<15 µg/L) (FIG. 9C). This is likely due to incomplete ARD of TCE to cis-1,2-DCE up gradient and subsequent transport of cis-1,2-DCE to the Well C location. After chitin emplacement, concentrations of cis-1,2-DCE dropped; however, significant concentrations of less-chlorinated degradation products VC and ethene were not produced (FIG. 9C). These data indicate that ARD of cis-1,2-DCE was not enhanced significantly in the vicinity of Well C by the chitin emplacement. This is consistent with the relative absence of electron donors in the form of VFAs and the presence of sulfate indicating that conditions were not appropriately reducing for ARD to be energetically favorable.

Results from the laboratory column study (Example 1) indicate that chitin is a viable electron donor and carbon source for the remediation of chloroethenes. Chitin fermentation products supported the dechlorination activity of supplementary cultures in all experiments. The slow and sustained production of VFAs from chitin could be a positive indication of the longevity of chitin in the field. Under the continuous-flow conditions tested in this study, chitin maintained reducing conditions and continued to produce VFAs for over 3 months. In addition, VFA "surfactants" produced from degradation of chitin were shown to increase the mass of DNAPL dissolved compared to a control without chitin. The implication of this effect is that, because of its surfactant-like properties, the use of chitin accelerates clean-up of a source area compared to an amendment without this capability where the rate of biodegradation may be limited by the rate of mass transfer to the aqueous phase where biodegradation takes place.

Results from the laboratory testing (Example 2) indicated that 20–40 size chitin could be successfully incorporated into a water-based hydroxypropyl guar base gel and subsequently formulated into a fracture slurry containing 20–40 size sand. The chitin was found to be compatible with the guar gel and was determined to not interfere with the functionality of the guar. The maximum mass ratio of chitin:sand that was accommodated in the fracture slurry in laboratory tests was 1:4.

Hydrologic data, geochemical data, and ARD data were presented for two monitoring wells to describe the overall impact of the pilot-scale chitin emplacement on the hydrologic system, geochemical environment, and subsequent remediation potential of the chitin emplacement technology (Example 3). Based on the results of the slug tests and pumping test, fracturing appeared to increase the hydraulic conductivity in the Well C area although it is not possible to distinguish between the effects of the fracturing and the increase in water levels observed between pre- and post-fracturing testing. The results of the pumping test indicate that Well B is hydraulically connected to all of the surrounding monitoring wells. The high degree of connectivity in an otherwise low permeable system is likely due to the creation of highly permeable sand-filled fractures surrounding Well B.

Data indicate that significant concentrations of VFAs produced from the degradation of chitin were observed at RW-9 but not at Well C. This suggests that the propagation of chitin-filled fractures from Well B was not symmetrical about Well B, but was influenced by matrix properties (such as bedding planes) and in situ soil stress conditions (degree of consolidation). Where significant concentrations of VFAs were observed in RW-9, the redox conditions became strongly reducing (sulfate reduction and methanogenesis were stimulated). At Well C, where significant concentrations of VFAs were not observed, sulfate concentrations remained high and methane low. As very reducing (methanogenic) conditions are required for complete ARD of TCE, enhanced ARD was observed at RW-9 but not at Well C.

The results of this field pilot test indicate that chitin, where present, was able to affect the redox conditions and support enhanced ARD. Where chitin was distributed (RW-9 area) redox conditions became more reducing and enhanced ARD was observed. While significant concentrations of VFAs persist at well RW-9 after 4 months, further monitoring is required to determine the longevity of chitin in the system. Where chitin was not distributed (Well C area), redox conditions were not impacted and enhanced ARD was not observed. While additional follow-on studies are required to determine the cost-effectiveness of full-scale operations, it appears that the chitin-fracturing technology is a technically viable remediation technology for low permeability, variably-saturated systems.

Therefore, chitin was successfully delivered to the low permeability sediments present at the Distler Site. Chitin fermentation products impacted the geochemistry of the aquifer such that the conditions required for complete dechlorination of TCE were created. Chitin fermentation products, where present, supported the enhanced dechlorination of TCE. The propagation of fractures in the subsurface was not homogeneous about the fracturing well and this issue should be considered during the design of the full-scale system to achieve the desired distribution of chitin in the subsurface.

Thus, chitin facilitates reductive dechlorination of PCE and TCE with efficiencies that make usage rates commercially feasible both by providing appropriate electron donors and by enhancing bioavailability. Further, chitin can be successfully integrated into an established delivery method for low permeability soils, and the delivery method successfully distributes chitin in high permeability fractures at an appropriate field site. Preliminary data demonstrated that after only a few months, chitin emplacement enhanced contaminant degradation in a field setting.

Other methods for injecting the chitin into selected formations can be used according to methods known in the art. Such method, besides hydraulic fracturing, include ultrasound, pulse injection, pneumatic fracturing, and jet injection.

EXAMPLE 4

Figure 10:
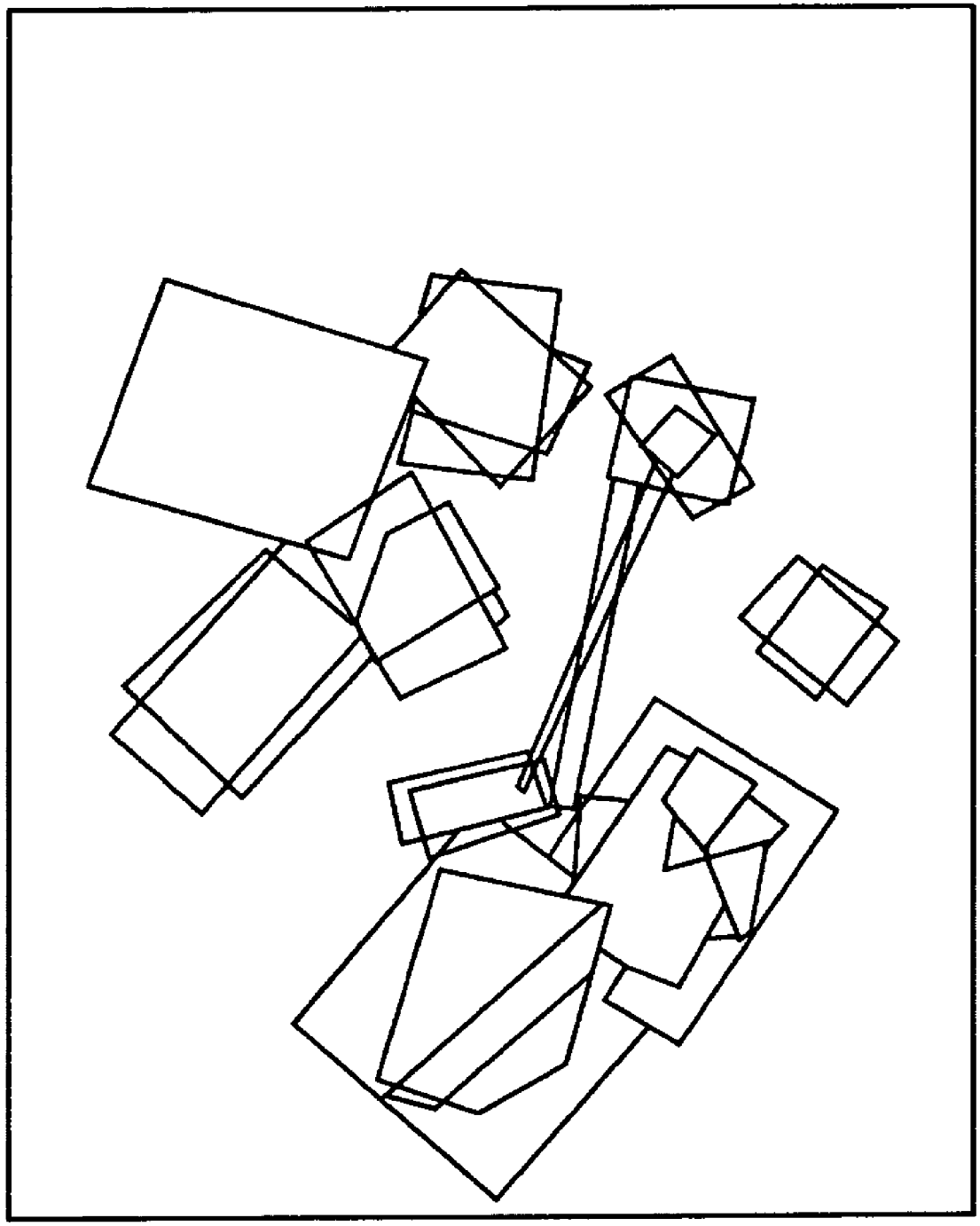
FIG. 10 shows a plan view of a full-scale, chitin-containing fracture network installed at the Distler Brickyard site.
Figure 11:
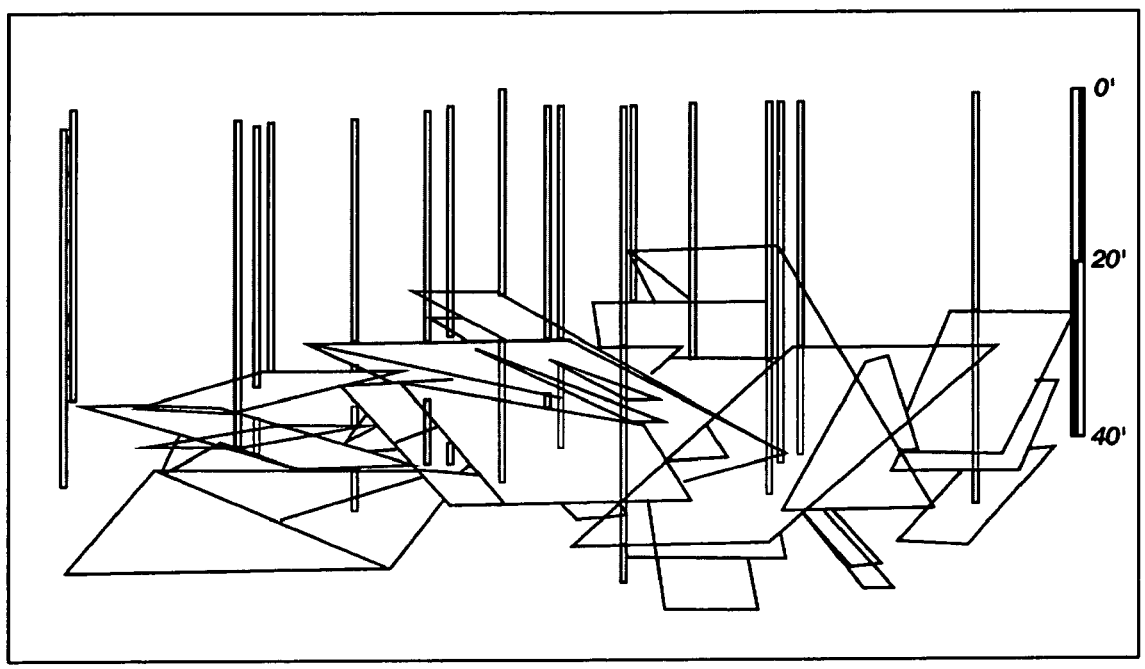
FIG. 11 shows a cross-section of the full-scale, chitin-containing fracture network installed at the Distler Brickyard site.
Figure 12A:
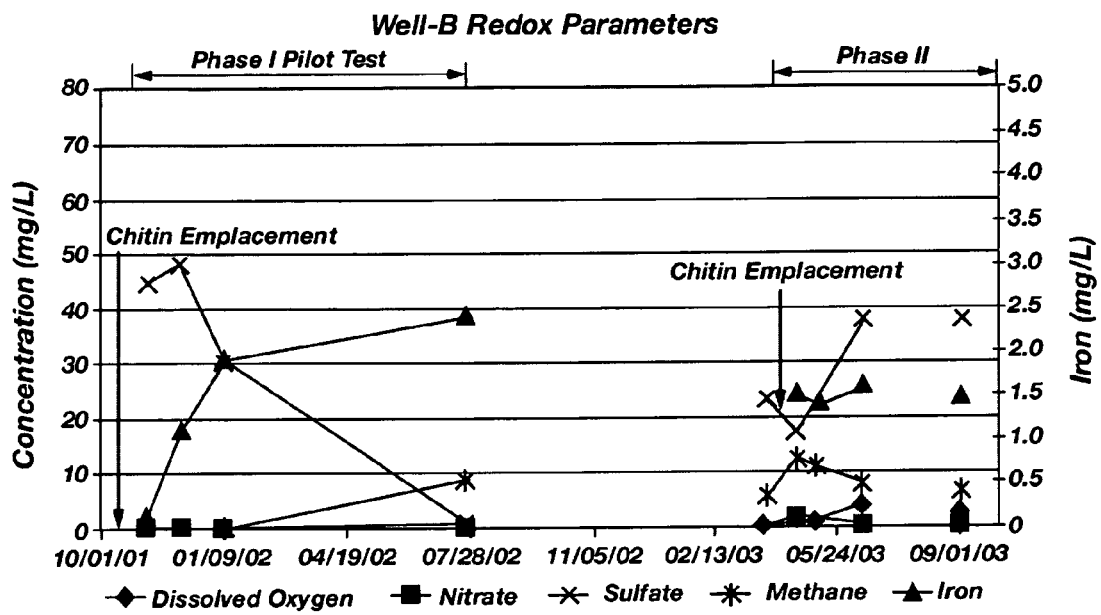
FIGS. 12A–B show representative redox conditions (Well-B and MW-11, respectively)
Figure 12B:
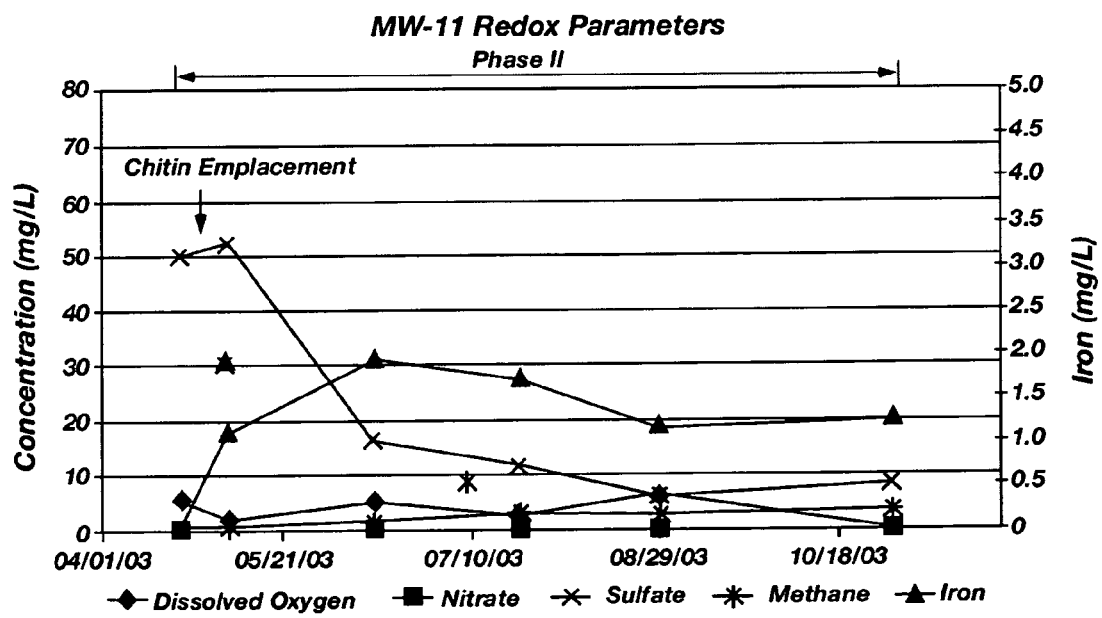
Figure 12C:
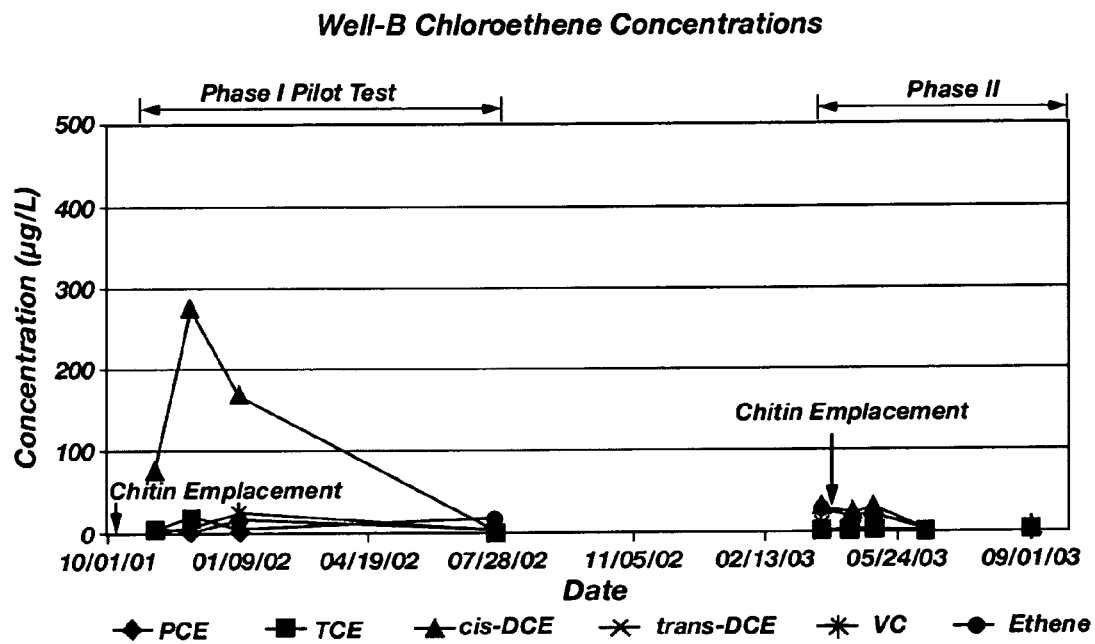
FIGS. 12C–D show dechlorination (Well-B and MW-11, respectively) at the Distler Brickyard site according to the present invention.
Figure 12D:
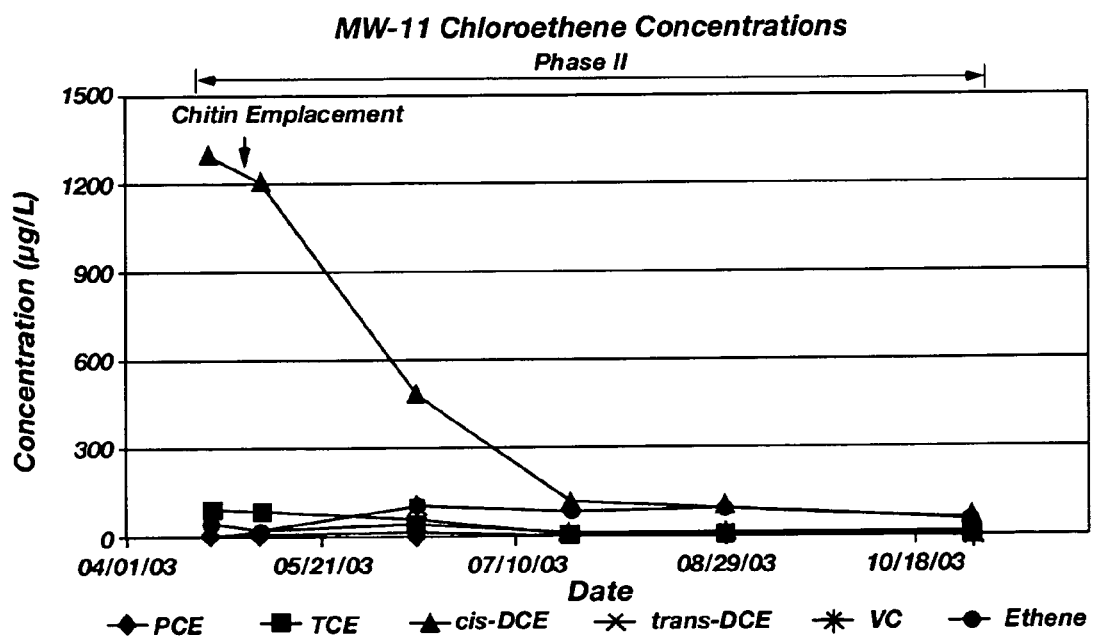
Figure 13:
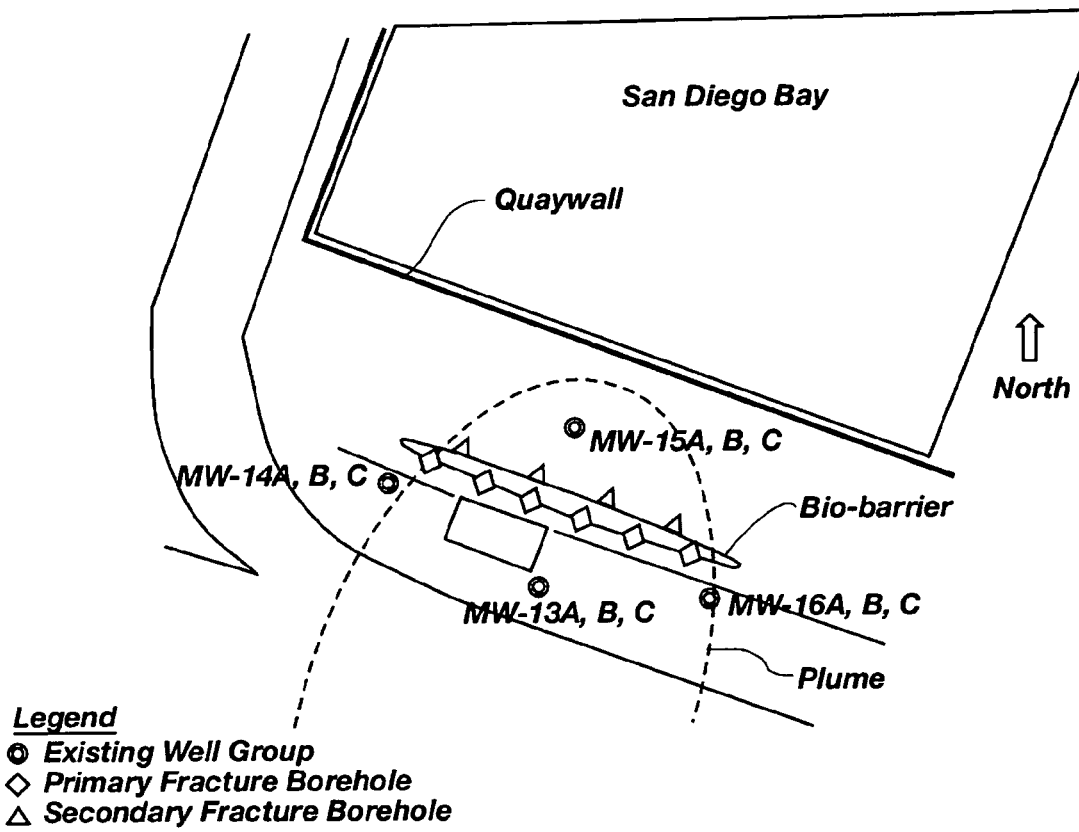
FIG. 13 shows a map of a bio-barrier at the OU24 site near San Diego, Calif.

In this example, the results of more than 8 months of data obtained from full-scale implementation of the presently described method at the Distler Brickyard site, described in Example 3, are summarized. Thirty-three injections of chitin were performed in ten injection locations, providing coverage of an area of about 10,000 square feet. The injections were monitored using tiltmeter geophysics, according to the procedures of Example 3, and verified by soil cores. G. H. Bures et al., Assessment of chitin distribution and fracture propagation during bio-fracing, Proceedings of the Fourth International Conference on Remediation of Chlorinated and Recalcitrant Compounds (Battelle Press, Columbus, Ohio, in press). A plan view of the projections of the horizontal extents of the 33 injections is shown in FIG. 10. Vertical coverage is shown in the cross-section view of FIG. 11. Complete vertical coverage of the contaminated aquifer and part of the unsaturated zone was achieved. Each of the injection planes shown is a chitin and sand-containing fracture that combine to form a network that facilitated contaminant degradation throughout the entire volume of the aquifer. The dip angle tends to correspond to the soil type or fabric. In particular, the more vertical fractures occur in higher permeability soils with less cohesion and without significant horizontal bedding. The effectiveness of the process for stimulating appropriate conditions for reductive dechlorination is shown in FIGS. 12A–D, showing representative redox changes and dechlorination trends in the treatment area. Table 4 shows concentration changes in all wells in the treatment area. Thirteen of sixteen were below MCLs for all but one contaminant of interest in less than 8 months.

TABLE 4

| | TCE (µg/L) | | cis-DCE (µg/L) | | Ethene (µg/L) | |
|---|---|---|---|---|---|---|
| Well | Initial Concentration | Final Concentration | Initial Concentration | Final Concentration | Initial Concentration | Final Concentration |
| RW-9 | 5.3 | 4.0U | 92 | 4.0U | 26 | 0.82J |
| RW-11 | 65 | 0.63J | 470 | 1.3 | 8.5 | 9.4 |
| Well-B | 4.7 | 0.62J | 98 | 6.0 | 4 | 3.5 |
| Well-C | 13 | 1.3 | 450 | 56 | 1.8 | 3.6 |
| MW-10 | 1.8J | 1.0U | 93 | 4.8 | 0.79J | 3.3 |
| MW-11 | 94 | 5.7 | 1,300 | 50 | 39 | 52 |
| MW-12 | 0.80AJ | 1.6 | 20A | 21 | 58 | 53 |
| MW-13 | 2.3 | 0.71J | 12 | 4.2 | 65 | 7.2 |
| MW-14 | 0.54J | 1.0U | 6.3 | 21 (average) | 32 | 97 (average) |
| MW-15 | 5.0U | 5.0U | 370 | 290 | 27 | 100 |
| MW-16 | 1.0U | 1.0U | 1.1 | 5.1A | 3.0A | 6.2 |
| MW-17 | 1.4A | 1.6 | 12A | 14 | 3.5 | 2.6U |
| FR-3 | 3.8J (average) | N/A | 210 (average) | N/A | 34 (average) | N/A |
| FR-4 | 20U | 10U | 1,700A | 910 | 14 | 190 |

TABLE 4-continued

| | TCE (μg/L) | | cis-DCE (μg/L) | | Ethene (μg/L) | |
|---|---|---|---|---|---|---|
| Well | Initial Concentration | Final Concentration | Initial Concentration | Final Concentration | Initial Concentration | Final Concentration |
| FR-8 | 1.0U | N/A | 0.86J | N/A | 1.1J | N/A |
| FR-10 | 0.51J | N/A | 5.3 | N/A | 13 | N/A |

EXAMPLE 5

This example relates to a biological barrier to be placed at the OU24 site near San Diego Bay, Calif., for the cleanup of chlorinated solvent contamination in the groundwater.

A biological barrier, or bio-barrier, is essentially a biological filter that comprises indigenous microorganisms attached to aquifer material that degrade or remove contaminants as they migrate through this biologically active area of the aquifer. Advantages of using bio-barriers include: (1) bio-barriers are able to clean up contaminated groundwater plumes even when the source of the plume cannot be located; (2) since they act passively, no energy input and only limited maintenance is required after installation; (3) monitoring wells are generally the only surface structures visible after installation; (4) disposal costs for treated waste are eliminated because contaminants are not brought to the surface; and (5) they work with natural systems.

Bio-barriers are established by adding degradable organic carbon and/or nutrients to the subsurface. The indigenous microorganisms present in the aquifer then increase in population and, as they degrade organic carbon, utilize available electron acceptors present in the groundwater. The free energy yielded by redox reactions varies substantially depending on the electron acceptor. During respiration, microorganisms will preferentially use the electron acceptors yielding the greatest free energy, as described above. Therefore, the dominant microbial community in a ground water system is largely dependent on the distribution of electron acceptors. Where oxygen is plentiful, aerobic bacteria will predominate; where oxygen is depleted, but nitrate is plentiful, nitrate-reducing bacteria will predominate; and so on. Once highly reducing conditions are created (i.e., methanogenic), complete anaerobic reductive dechlorination (ARD) becomes energetically favorable and is facilitated if indigenous dechlorinating microorganisms are present in sufficient number. *Dehalococcoides ethenogenes* (DHE) in an anaerobic bacterial strain that has been shown to grown in pure culture by the reductive dechlorination of PCE, TCE, DCE, and VC. X. Maymó-Gatell et al., Reductive dechlorination of chlorinated ethenes and 1,2-dichloroethane by "*Dehalococcoides ethenogenes*" 195, 65 Appl. Environ. Microbiol. 3108–3113 (1999); J. He et al., Complete detoxification of vinyl chloride by an anaerobic enrichment culture and identification of the reductively dechlorinating population as a *Dehalococcoides* species, 69 Appl. Environ. Microbiol. 996–1003 (2003). *Dehalococcoides* group organisms and their association with chloroethene contaminated sites have also been examined in the field. Full dechlorination of chloroethenes to ethene occurred at sites where *Dehalococcoides* group organisms were detected. However, *Dehalococcoides* organisms were not detected in samples from sites at which partial dechlorination of chloroethenes occurred, where dechlorination appeared to stop at 1,2-cis-dichloroethene. E. R. Hendrickson et al., Molecular analysis of *Dehalococcoides* 16S ribosomal DNA from chloroethene-contaminated sites throughout North American and Europe, 68 Appl. Environ. Microbiol. 485–495 (2002).

Site data indicate that ARD has occurred and is an ongoing process in OU 24 groundwater. The presence of 1,2-DCE (both isomers), vinyl chloride, and ethene provides direct evidence that the parent solvents at the site, PCE and TCE, have been significantly degraded. Results of microbial DNA analysis performed at the site show that DHE and *Desulfuromonas* spp. bacterial populations are present in OU 24 groundwater to reduce sulfate and degrade the remaining chlorinated ethenes. However, while the presence of ethene and the microbial communities show that VOC degradation is occurring in the downgradient portion of the plume, low total organic carbon (TOC) concentrations detected at OU 24 indicate that electron donor levels are limiting and contribute to low degradation rates that are insufficient to overcome the rate of contaminant transport. To introduce electron donor at OU 24, and to optimize conditions for ARD so the remaining chlorinated ethenes are degraded before reaching the quay wall and potentially San Diego Bay, a bio-barrier was selected to be emplaced in the downgradient area. Buildings, numerous underground utilities, the underground quaywall structure, and security restrictions that are put into place when ships are docked at the adjacent pier limit remedial activities in this area. Chitin was selected as the electron donor for a bio-barrier because it can be emplaced with minimal disturbance to the buildings, roads, and underground utilities in the OU-24 area, and because it is relatively long-lived source, access requirements to this restricted area will be minimized. In addition, the emplacement of chitin using the present process will have minimal effects on hydraulic conductivity in the bio-barrier, decreasing the possibility of contaminants flowing around the bio-barrier.

The approach at OU 24 is to create a bio-barrier using the present process to emplace a network of fractures containing chitin across the downgradient, leading edge of the dissolved solvent plume in Zone B. The bio-barrier will comprise two treatment walls of overlapping, vertically ascending chitin fractures. The chitin-fracture network is designed to provide a continuous and effective bio-treatment barrier across the leading edge of the "Zone B" solvent contaminant plume. The design includes a determination of the maximum chitin delivery per fracture, the most effective configuration of fracture placement, the optimal slurry volume and fracture radius per fracture (based on its location and fracture initiation depth), the optimal slurry viscosity (to carry and distribute chitin uniformly within the fracture), the optimal fracture slurry volume and concentration (to provide maximum fracture extent and chitin thickness), the most operationally suitable pumping rates and injection pressures, and field delivery methods best suited for site-specific soil conditions. Each individual chitin fracture propagated will be mapped using tiltmeter geophysics to determine its geometric configuration and orientation.

Typically, an array of 12 to 25 surface-mounted tiltmeters is set up in a grid or concentric configuration around each fracture borehole location. The tiltmeter spacing and configuration is determined by the number of fractures placed per borehole and the depth of fracture placement. During fracturing, ground surface "tilt" will be measured at each tiltmeter station and the information stored in on-site dataloggers. Based on this information, the fracture design may be modified in the field, if necessary, to optimize fracture placement in the zone of contamination.

Borehole logs for the downgradient "Zone B" area indicate that the underlying soils are generally comprised of fine grained sands with occasional sandy silt layers usually encountered between 10 ft and 25 ft depth below ground surface (bgs). Groundwater is reported to be encountered at 5 ft below ground surface (bgs). The width of the "Zone B" plume bounded by monitoring wells nests at MW-14 to MW-16 is approximately 220 ft. The delineated vertical distribution of solvent contamination between these wells is reported to be between 15 ft and 40 ft bgs.

To optimize the distribution of chitin in the subsurface and effect a bio-barrier, 5 chitin-fractures at each of ten to twelve fracture borehole locations in two rows across the leading edge of the Zone B contaminant plume will be emplaced, as shown in FIG. 4-2. The primary segment of the bio-barrier ("P") will be approximately 210 ft in length and comprise a minimum of 6 fracture boreholes and emplacement of 30 chitin-fractures. The secondary segment of the bio-barrier ("S"), located closest to the quay wall, will be approximately 130 ft in length and comprise a minimum of 4 fracture boreholes and emplacement of 20 chitin fractures (FIG. 4-2). Chitin-fractures will be initiated at depth intervals of 25 ft, 35 ft, and 45 ft at all proposed fracture borehole locations along the primary and secondary bio-barrier segments. One chitin-fracture will be placed at 25 ft depth per borehole and two chitin-fractures will be placed at 35 and 45 ft depths at each borehole in order to provide overlapping chitin-fractures.

Fractures placed in these cohesionless sediments are expected to have a strongly developed upward vertical component as they propagate radially from the well. The theoretical design radius of each chitin fracture based on the pumping volume is 15 to 20 ft. In comparison, the anticipated vertical extent of chitin fractures from their point of initiation could exceed 20 ft because fractures tend to propagate preferentially upwards towards the zero stress boundary at the ground surface. It should be noted, however, that fractures cannot be "steered" or manipulated to assume any particular geometry or orientation. Fractures propagate in a manner determined by the in situ stress conditions and fabric of the subsurface soils. Should any geologic constraints preclude the initiation of exactly the number of chitin fractures proposed per borehole, then the design volume of fracture slurry containing chitin can be increased in other fractures yet to be placed, in order to make up the difference. Alternatively, additional fracture boreholes can be incorporated to inject the required fracture slurry containing chitin to make up the difference.

All chitin-fractures will contain 265 gallons of fracture slurry containing chitin. The total design volume of chitin fracture slurry that will be injected at each fracture borehole is 1,325 gallons containing 3,000 lb of chitin.

Before mobilizing equipment at OU24, all potentially conflicting underground utility lines will be located and marked and project supervisors will be shown the exact location of all underground lines in order to stay clear of any and all underground lines or underground facilities. Additionally, all proposed fracture-borehole locations will be surveyed in and staked so that a constant well spacing of no less than 30 ft is maintained across both proposed bio-barrier segments. Any site preparation work required to permit access of drilling and fracturing equipment/vehicles to the fracturing locations will also be completed before fracturing operations commence. Finally, a clean water supply for on-site fracture formulation will be secured.

Once equipment has been mobilized, and before fracturing commences at fracture well locations, an array of 12 to 15 surface mounted tiltmeter stations will be set up on a concentric grid around the proposed fracture borehole. During this work activity, the chitin-fracture slurry will be prepared. Fluid formulation, batch mixing, and pumping will be conducted using a skid-mounted, pumping and mixing unit.

Based on the soil conditions described at the site, it is not anticipated that pre-drilling will be required to advance the fracturing probe to the initial fracturing depth of 25 ft. The preferred and quickest method of advancing the fracture tool string is with direct push drilling. If geologic constraints preclude advancing the fracturing probe to this depth, then a borehole should be pre-drilled using auger drills to approximately 3 feet above the first fracture. The augers will then be withdrawn out of the borehole and replaced with a fracture probe, which can then be lowered into the borehole and advanced to the first fracture initiation point. Once the fracture probe has been properly sealed at the first initiation point, fracture slurry will be pumped under hydraulic pressure to initiate and propagate a radial fracture from this depth. The anticipated volume of fracture slurry to be pumped will be specific to the depth of fracture initiation and site geologic conditions as determined in the chitin-fracture design specifications.

During the fracturing process, surface mounted tiltmeters will record the micro-movements in the ground surface in response to fracturing. These data are stored in dataloggers for subsequent downloading and geophysical analysis of fracture geometry. On-board computers and instrumentation on the mixing and pumping equipment will record frac pressure and flow vs. time. Operators will also manually monitor fracture fluid density and viscosity. Fracture initiation pressures and bottom-hole injection pressures are anticipated to be below 350 psi.

After the first batch of fracture slurry has been pumped to completion, a new batch of fracture fluid will be formulated. Once it has been prepared, the fracture tool assembly will be advanced downward to the next fracture depth and the above described procedure will be repeated. It is anticipated that 5 batch mixtures of fracture slurry will need to be formulated per fracture borehole at the OU 24 site. Once all of the fractures have been placed, the fracture tool assembly will be raised out of the borehole. The chitin injection boreholes will be abandoned according to site-specific requirements once the desired amount of chitin is emplaced.

The bio-barrier dechlorination performance will be assessed by evaluating redox conditions, changes in daughter products (i.e., cis-DCE transformation to vinyl chloride (VC) and ethene), change in the chlorine number, reduction in the chlorinated compound mass, and growth of dechlorinating bacteria (i.e., DHE), according to methods well known in the art.

The subject matter claimed is:

1. A method for increasing remediation of a contaminated subsurface formation, the method comprising:
    (a) fracturing the subsurface formation to result in a network of fractures in the formation; and (b) simultaneously injecting an aqueous slurry comprising an optional proppant and a solid-phase or nonaqueous-phase treatment agent into the network of fractures.

2. The method of claim 1 wherein the fracturing comprises hydraulic fracturing.

3. The method of claim 1 wherein the injecting comprises applying ultrasound, pulse injection, pneumatic fracturing, jet injection, or combinations thereof.

4. The method of claim 1 wherein the subsurface formation is a low permeability formation.

5. The method of claim 1 wherein the proppant comprises sand.

6. The method of claim 1 wherein the solid-phase or nonaqueous-phase treatment agent comprises chitin.

7. The method of claim 1 wherein the solid-phase or nonaqueous-phase treatment agent comprises a high-viscosity agent.

8. The method of claim 1 wherein the solid-phase or nonaqueous-phase treatment agent comprises an agent for increasing abiotic reduction of contaminants.

9. The method of claim 8 wherein the agent for increasing abiotic reduction of contaminants comprises zero-valent iron.

10. The method of claim 1 wherein the subsurface formation is contaminated with a chlorinated contaminant.

11. The method of claim 10 wherein the solid-phase or nonaqueous-phase treatment agent comprises an electron donor for increasing anaerobic reductive dechlorination of the chlorinated contaminant.

12. The method of claim 11 wherein the electron donor comprises chitin.

13. The method of claim 10 wherein the chlorinated contaminant comprises perchloroethylene (PCE), trichloroethylene (TCE), dichloroethylene (DCE), vinyl chloride (VC), and mixtures thereof.

14. A method for treating groundwater comprising a plume of contamination in a subsurface formation, the method comprising:
   (a) determining the size, depth, and direction of movement of the plume of contamination in the subsurface formation;
   (b) creating a treatment zone configured for intercepting the plume of contamination, comprising
      (1) fracturing the subsurface formation to result in a network of fractures in the formation, and
      (2) simultaneously injecting an aqueous slurry comprising an optional proppant and a solid-phase or nonaqueous-phase treatment agent into the network of fractures; and
   (c) monitoring conversion of one or more contaminants in the plume of contamination into one or more non-hazardous products.

15. The method of claim 14 wherein the fracturing comprises hydraulic fracturing.

16. The method of claim 14 wherein the injecting comprises applying ultrasound, pulse injection, pneumatic fracturing, jet injection, or combinations thereof.

17. The method of claim 14 wherein the proppant comprises sand.

18. The method of claim 14 wherein the solid-phase or nonaqueous-phase treatment agent comprises chitin.

19. The method of claim 14 wherein the solid-phase or nonaqueous-phase treatment agent comprises a high-viscosity agent.

20. The method of claim 14 wherein the solid-phase or nonaqueous-phase treatment agent comprises an agent for increasing abiotic reduction of contaminants.

21. The method of claim 20 wherein the agent for increasing abiotic reduction of contaminants comprises zero-valent iron.

22. The method of claim 14 wherein the subsurface formation is contaminated with a chlorinated contaminant.

23. The method of claim 22 wherein the solid-phase or nonaqueous-phase treatment agent comprises an electron donor for increasing anaerobic reductive dechlorination of the chlorinated contaminant.

24. The method of claim 23 wherein the electron donor comprises chitin.

25. The method of claim 22 wherein the chlorinated contaminant comprises perchloroethylene (PCE), trichloroethylene (TCE), dichloroethylene (DCE), vinyl chloride (VC), and mixtures thereof.

26. A method for increasing anaerobic reductive dechlorination of a chlorinated source area in a low permeability formation comprising:
   (a) fracturing the low permeability formation to result in a network of fractures in the formation; and
   (b) partially filling the network of fractures with an aqueous slurry comprising a proppant and a solid phase electron donor.

27. The method of claim 26 wherein the solid phase electron donor comprises chitin.

28. The method of claim 26 wherein the proppant comprises sand.

29. The method of claim 26 wherein the partially filling the network of fractures comprises hydraulic fracturing.

30. The method of claim 26 wherein the partially filling the network of fractures comprises applying ultrasound.

31. The method of claim 26 wherein the partially filling the network of fractures comprises pulse injection.

32. The method of claim 26 wherein the partially filling the network of fractures comprises pneumatic fracturing.

33. The method of claim 26 wherein the partially filling the network of fractures comprises jet injection.

* * * * *